(12) United States Patent
Lo et al.

(10) Patent No.: US 10,823,967 B2
(45) Date of Patent: Nov. 3, 2020

(54) NEAR-EYE LIGHT FIELD DISPLAY DEVICE AND NEAR-EYE DISPLAY DEVICE

(71) Applicant: Coretronic Corporation, Hsin-Chu (TW)

(72) Inventors: Hsin-Hsiang Lo, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 170 days.

(21) Appl. No.: 16/133,570

(22) Filed: Sep. 17, 2018

(65) Prior Publication Data

US 2019/0094545 A1 Mar. 28, 2019

(30) Foreign Application Priority Data

Sep. 26, 2017 (CN) .......................... 2017 1 0910334

(51) Int. Cl.
*G02B 27/01* (2006.01)
*H04N 13/332* (2018.01)
(Continued)

(52) U.S. Cl.
CPC ..... *G02B 27/0172* (2013.01); *G02B 27/0961* (2013.01); *G02B 30/27* (2020.01);
(Continued)

(58) Field of Classification Search
CPC .................................................. G02B 27/0172
See application file for complete search history.

(56) References Cited

U.S. PATENT DOCUMENTS 6,349,004 B1 2/2002 Fischer et al.
2004/0130783 A1* 7/2004 Solomon .............. G02B 27/017
359/462

(Continued)

FOREIGN PATENT DOCUMENTS

CN 105137590 A 12/2015
CN 106338830 A 1/2018
(Continued)

OTHER PUBLICATIONS

Anonymous: "Chromatic aberration—Wikipedia", Aug. 27, 2017 (Aug. 27, 2017), XP055546115, Retrieved from the Internet: URL: https://web.archive.org/web/20170827064953/https://en.wikipedia.org/wiki/Chromatic_aberration [retrieved on Jan. 22, 2019].

(Continued)

*Primary Examiner* — Gustavo Polo

(57) ABSTRACT

A near-eye light field display device includes a display element, a microlens array and an optical element. The display element has a plurality of micro-image units and each of the plurality of micro-image units is configured to provide an elemental image beam. The microlens array is disposed in front of the display element and has a plurality of microlenses corresponding to the plurality of the micro-image units respectively. The optical element is disposed in front of the microlens array and located on a transmission path of the elemental image beams from the microlenses. An Abbe number of the microlens array is $Vd_{MLA}$, a refractive index of the microlens array is $nd_{MLA}$, an Abbe number of the optical element is $Vd_{OE}$, a refractive index of the optical element is $nd_{OE}$, and the microlens array and the optical element meet at least one of: $Vd_{OE} > Vd_{MLA}$ and $nd_{OE} < nd_{MLA}$.

16 Claims, 23 Drawing Sheets

(51) Int. Cl.
    *G03B 21/14* (2006.01)
    *G02B 27/09* (2006.01)
    *G02B 30/27* (2020.01)

(52) U.S. Cl.
    CPC ......... *G03B 21/142* (2013.01); *H04N 13/332* (2018.05); *G02B 2027/0127* (2013.01)

(56) References Cited

U.S. PATENT DOCUMENTS

2015/0049390 A1  2/2015  Lanman et al.
2017/0269353 A1  9/2017  Xu

FOREIGN PATENT DOCUMENTS

WO  2014144157 A   9/2014
WO  2017108211 A1  6/2017

OTHER PUBLICATIONS

Hong Hua et al, A 3D Integral Imaging Optical See-Through Head-Mounted Display, Optics Express, Jun. 2, 2014, vol. 22, No. 11, US.

* cited by examiner

NEAR-EYE LIGHT FIELD DISPLAY DEVICE AND NEAR-EYE DISPLAY DEVICE

CROSS-REFERENCE TO RELATED APPLICATION

THIS APPLICATION CLAIMS THE PRIORITY BENEFIT OF CHINA APPLICATION (CN201710910334.6 FILED ON 2017 Sep. 29). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a display device, and more particularly to a near-eye light field display device.

BACKGROUND OF THE INVENTION

Near-eye light field display device is a display device using light field display technology to produce stereoscopic images. A real image is formed on an imaging surface by a light filed image display device with a microlens array such that an observer can see a light field image which may be perceived in depth direction and shown as like far away.

However, the conventional near-eye light field display devices generally use a freeform prism or a multi-piece eyepiece for imaging, causing the conventional near-eye light field display devices thick, heavy, and thus not suitable for long time wearing. Moreover, the freeform prisms are generally made of plastic materials, and its optical material has a lower Abbe number and the dispersion is more serious. Further, if a wider field of view (FOV) of the near-eye light field display devices is desired, the thickness and weight of the freeform prism or the multi-piece eyepiece would be increased accordingly, causing a limited field of view for the conventional near-field light field display devices. Therefore, how to reduce the thickness and weight of the near-field light field display device while improving the field of view is actually a focus of attention for the persons in the field of the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a near-eye light field display device configured to reduce the thickness and weight while improving the field of view.

The invention further provides a near-eye display device configured to reduce the thickness and weight and improve the field of view while the depth of field being adjustable.

Other objectives and advantages of the invention can be further understood from the technical features disclosed in the invention.

In order to achieve one or a part or all of the above objectives or other objectives, an embodiment of the invention provides a near-eye light field display device, which includes a display element, a microlens array and an optical element. The display element has a plurality of micro-image units. Each of the micro-image units is configured to provide an elemental image beam. The microlens array is disposed in front of the display element and has a plurality of microlenses. The microlenses correspond to the micro-image units respectively. The optical element is disposed in front of the microlens array and located on a transmission path of the elemental image beams from the microlenses. The microlens array is located between the optical element and the display element. Each of the elemental image beams passes through the corresponding microlens and is projected toward the optical element. An Abbe number of the microlens array is $Vd_{MLA}$, a refractive index of the microlens array is $nd_{MLA}$, an Abbe number of the optical element is $Vd_{OE}$, a refractive index of the optical element is $nd_{OE}$, and the microlens array and the optical element meet at least one of conditions: $Vd_{OE}>Vd_{MLA}$ and $nd_{OE}<nd_{MLA}$.

In order to achieve one or a part or all of the above objectives or other objectives, another embodiment of the invention provides a near-eye display device, which includes a display element, a microlens array and an optical element. The display element has a plurality of micro-image units. Each of the micro-image units is configured to provide an elemental image beam. The microlens array is disposed in front of the display element and has a plurality of microlenses. The microlenses correspond to the micro-image units respectively. The optical element is disposed in front of the microlens array and located on a transmission path of the elemental image beams from the microlenses. The microlens array is located between the optical element and the display element. Each of the elemental image beams passes through the corresponding microlens and is projected toward the optical element. At least one of the microlens array and the optical element has an adjustable focal length.

In summary, with an optical element disposed in front of the microlens array and they both meeting at least one of the following conditions: $Vd_{OE}>Vd_{MLA}$ and $nd_{OE}<nd_{MLA}$, the near-eye light field display devices of the embodiments of the invention can achieve a reduced thickness and weight and an improved field of view. In addition, since at least one of the microlens array and the optical element has an adjustable focal length, the near-eye display device in the embodiment of the invention has a function of focus accommodation and can change the field of view and the angular resolution.

Other objectives, features and advantages of the present invention will be further understood from the further technology features disclosed by the embodiments of the present invention, wherein preferred embodiments of this invention are shown and described by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
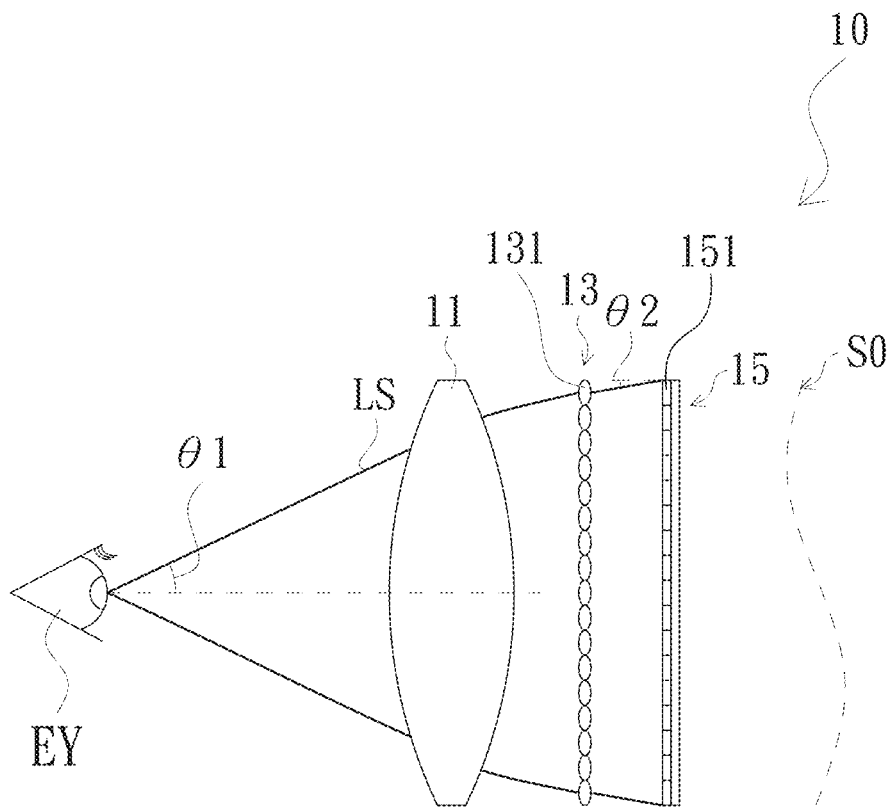
FIG. 1 is a schematic view of a near-eye light field display device in accordance with an embodiment of the invention.

FIG. 1 is a schematic view of a near-eye light field display device in accordance with an embodiment of the invention. Referring to FIG. 1, the near-eye light field display device 10 of the embodiment includes a display element 15, a microlens array 13 and an optical element 11. The display element 15 includes a plurality of micro-image units 151. Each of the micro-image units 151 is used for providing an elemental image beam LS (FIG. 1 is schematically illustrated with the upper boundary of the elemental image beam LS emitted from the micro-image unit 151 located on the upper edge and the lower boundary of the elemental image beam LS emitted from the micro-image unit 151 located on the lower edge as examples). The microlens array 13 is disposed in front of the display element 15 and has a plurality of microlenses 131. The microlenses 131 correspond to the micro-image units 151 of the display element 15, respectively. The optical element 11 is disposed in front of the microlens array 13 and is located on the transmission path of the elemental image beams LS from the microlenses 131. The microlens array 13 is located between the optical element 11 and the display element 15, and each of the elemental image beams LS is projected toward the optical element 11 through the corresponding microlens 131.

The Abbe number of the microlens array 13 is denoted by $Vd_{MLA}$, the refractive index of the microlens array 13 is denoted by $nd_{MLA}$, the Abbe number of the optical element 11 is denoted by $Vd_{OE}$, and the refractive index of the optical element 11 is denoted by $nd_{OE}$. In the embodiment, the material of each microlens 131 is identical, for example, such that the Abbe number of the microlens array 13 is equal to the Abbe number of each microlens 131, and the refractive index of the lens array 13 is equal to the refractive index of each microlens 131, for example. In the embodiment, the microlens array 13 and the optical element 11 meet at least one of the conditions: $Vd_{OE} > Vd_{MLA}$ and $nd_{OE} < nd_{MLA}$. As such, the aberration can be eliminated with the configuration in which the optical element 11 and the microlens array 13 are different in material, so as to achieve a clear image with high quality.

As shown in FIG. 1, in the embodiment, the optical element 11 is a biconvex lens for example, but the invention is not limited thereto. In the embodiment, each of the micro-image units 151 of the display element 15 includes, for example, a plurality of pixels (not shown) used for providing the elemental image beam LS. Each of the image beams LS is projected to the optical element 11 via the corresponding microlens 131. In the embodiment, the optical element 11 is used for collecting the elemental image beams LS projected through the microlenses 131 and transmitting the elemental image beams LS to the eyes EY of the user. In the embodiment, the eyes EY of the user may see a light field virtual image S0 shown as like far away, and thus the user can see a light field image which may be perceived in depth direction.

Figure 2A:
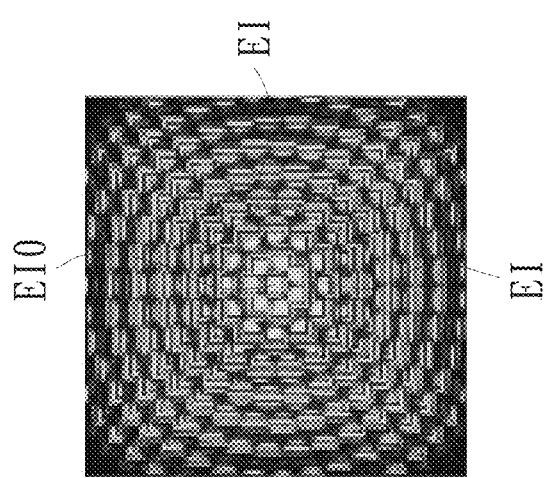
FIG. 2A is a schematic view of a plurality of elemental images respectively displayed by a plurality of micro-image units of a display element of the near-eye light field display device in the embodiment shown in FIG. 1.
Figure 2B:
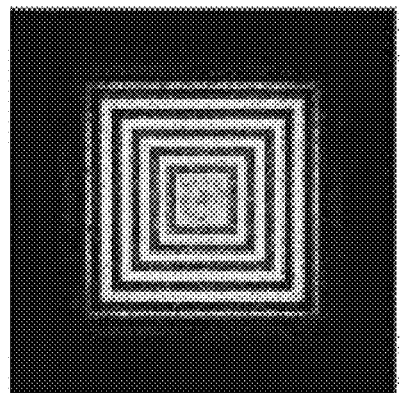
FIG. 2B is a schematic view of an image observed by the user's eyes through the near-eye light field display device of the embodiment shown in FIG. 1.

Referring to FIGS. 2A and 2B, FIG. 2A is a schematic view of a plurality of elemental images respectively displayed by a plurality of micro-image units of a display element of the near-eye light field display device in the embodiment shown in FIG. 1. FIG. 2B is a schematic view of an image observed by the user's eyes through the near-eye light field display device of the embodiment shown in FIG. 1. The elemental images EI0 and EI shown in FIG. 2A are examples formed by the elemental image beams LS provided by the micro-image units 151 of the display element 15. As shown in FIG. 2A, in the embodiment, a plurality of the micro-image units 151 display one elemental image EI0 and a plurality of elemental images EI, wherein the elemental image EI0 is defined as a central elemental image and the plurality of elemental images EI surround the central elemental image (i.e., elemental image EI0). In the embodiment, each of the elemental images EI0 and EI is projected to the optical element 11 via the corresponding microlens 131 and then projected to the eyes EY of the user via the optical element 11, so that the user can see the image as shown in FIG. 2B. Thus, with the configuration of the near-eye light field display device 10 of the embodiment which comprises the display element 15, the microlens array 13 and the optical element 11, the user may see a light field image which may be perceived in depth direction. However, the elemental images EI0 and EI generated by the display element 15 shown in FIG. 2A are illustrated by way of example, and the invention is not limited thereto.

Figure 3:
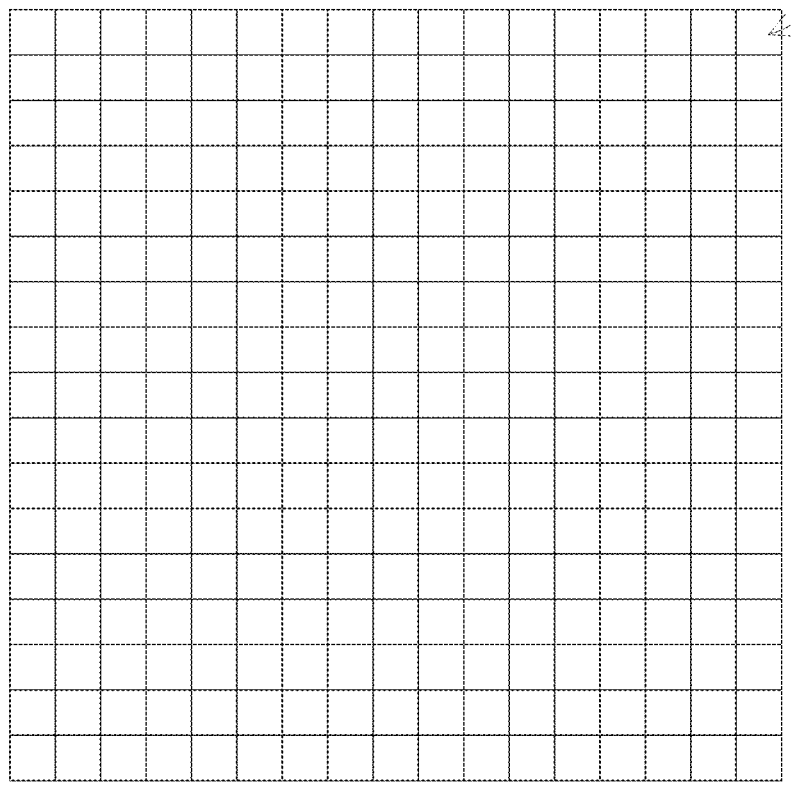
FIG. 3 is a schematic view of a microlens array of the near-eye light field display device of the embodiment shown in FIG. 1.

FIG. 3 is a schematic view of a microlens array of the near-eye light field display device of the embodiment shown in FIG. 1. Referring to FIG. 3, in the embodiment, the plurality of microlenses 131 of the microlens array 13 are arranged in a matrix for example, but the invention is not limited thereto. In the embodiment, the focal length of each microlens 131 is identical for example. In an embodiment, the focal lengths of the microlenses 131 may be different. For example, as shown in FIG. 3, along the horizontal line (i.e., along a row) on which the central microlens 131 of the microlens array 13 is located, the plurality of microlenses 131 may have different focal lengths which vary gradually along the directions from the central microlens 131 to the leftmost or the rightmost microlens 131. Optionally, along the vertical line (i.e., along a column) on which the central microlens 131 of the microlens array 13 is located, the plurality of microlenses 131 may have different focal lengths which vary gradually along the directions from the central microlens 131 to the upmost or the lowmost microlens 131. In an embodiment, the various focal lengths may increase gradually in value along the directions from the center to the left or right, or along the directions from the center to the top or bottom, but the invention is not limited thereto. In an embodiment, along the directions from the center to the left or right, or along the directions from the center to the top or bottom, the various focal lengths may first increase and then reduce in value, but the invention is not limited thereto. However, the various focal lengths may vary in different ways as required by different designs. In an embodiment where various microlenses 131 have different focal lengths, the image projection may be tuned finely, so as to achieve a clearer image with high quality.

In the embodiment of FIG. 1, the optical element 11 may cause the elemental image beam LS to turn by a significant angle, so that the microlenses 131 of the microlens array 13 may not need to adopt the special design of the inclined optical surface. That is, a general microlens array design without inclined optical surfaces can be adopted to improve the convenience and yield during manufacturing/process and further to avoid breakages between the optical surfaces of adjacent microlenses. In addition, the near-eye light field display device 10 of the embodiment can alleviate/solve the problems of reduced amount of incident light and reduced effective area of microlens (or, reduced effective aperture) caused by the conventional near-eye light field display device which uses a microlens array with the optical surfaces having the breakages. Thus, the near-eye light field display device 10 of the embodiment can improve the imaging quality. In addition, in the embodiment, since the elemental image beam LS can be turned by a large angle with the optical element 11, the incident angle θ1 of the elemental image beam LS entering the user's eyes EY may be much greater than the exit angle θ2 of the elemental image beam LS emitted from the micro-image unit 151.

Therefore, the near-eye light field display device 10 can achieve a large field of view without a great overall thickness.

However, the design of the optical element of the invention is not limited to FIG. 1. Other embodiments of the near-eye light field display device using different optical elements will be described below, but the invention is not limited to the following embodiments.

Figure 4A:
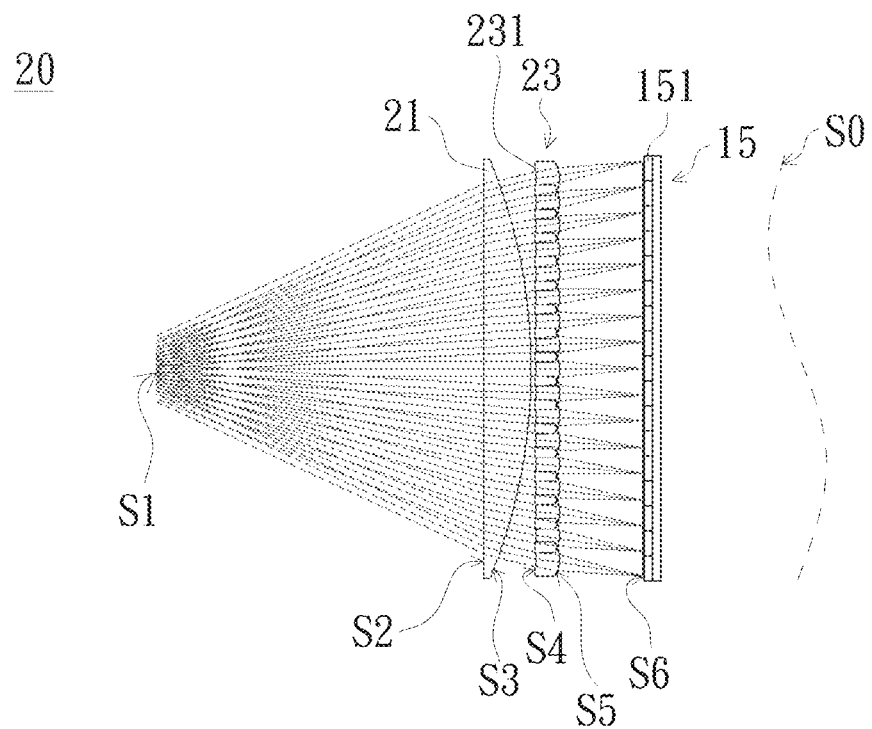
FIG. 4A is a schematic view of a near-eye light field display device in accordance with another embodiment of the invention.

FIG. 4A is a schematic view of a near-eye light field display device in accordance with another embodiment of the invention. Referring to FIG. 4A, in the embodiment, the near-eye light field display device 20 includes a display element 15, a microlens array 23 and an optical element 21. The near-eye light field display device 20 of the embodiment has a similar structure and function as the near-eye light field display device 10 shown in FIG. 1. The embodiment shown in FIG. 4A is different from the embodiment shown in FIG. 1 in that the optical element 21 has a first surface S3 and a second surface S2, the first surface S3 is adjacent to the microlens array 23, the second surface S2 is away from the microlens array 23, the first surface S3 is located between the second surface S2 and the microlens array 23, the first surface S3 is a convex surface, and the second surface S2 is a plane surface. That is, the optical element 21 of the embodiment is a planoconvex lens, wherein the convex surface (first surface S3) is located between the plane surface (second surface S2) and the microlens array 23. In the embodiment, the first surface S3 may be a spherical surface or an aspherical surface, and the invention is not limited thereto. In addition, the structure of the microlens array 23 in the embodiment is similar to that in FIG. 3 and may be constituted by a plurality of microlenses 231 having identical or different focal lengths.

Taking the case where the focal lengths of each microlens 231 of the microlens array 23 are identical and the value is for example 3.392 mm as an example, other parameters are as shown in Tables 1 and 2 below. However, it is understood that the data in Tables 1 and 2 and the tables mentioned below are not intended to limit the invention. Any skilled in the art may make appropriate changes to the parameters or settings after reading the invention, but the changes in parameters or settings should still fall within the scope of the invention.

TABLE 1

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 12.695 | | |
| Optical element | S2 | Infinity | 2.677 | 1.533 | 55.732 |
| | S3 | −20.451 | 0.2 | | |
| Microlens array | S4 | −2.907 | 1 | 1.59 | 29.921 |
| | S5 | −1.337 | 3.5 | | |
| Display element | S6 | Infinity | | | |

Please refer to FIG. 4A and Table 1. In FIG. 4A, the spacing in Table 1 indicates the linear distance between two adjacent surfaces along the optical axis of the near-eye light field display device 20. For example, in the embodiment, the spacing of the surface S1 indicates the linear distance between the surface S1 and the surface S2 along the optical axis. In addition, in the embodiment as shown in FIG. 4A, the spacing of the surface S0 is −1000 mm, which indicates that the light field virtual image is located 1000 mm in front of the pupil. In addition, in the embodiment, the surface having a positive radius of curvature means that the surface is curved toward the left side of the figure, and the surface having a negative radius of curvature means that the surface is curved toward the right side of the figure.

In the embodiment, surfaces S3, S4 and S5 are aspherical surfaces for example and meet the following equation:

$$Z = \frac{Y^2/R}{1 + \sqrt{1-(1+K)(Y/R)^2}} + BY^2 + CY^4 + DY^6 + EY^8 + FY^{10} + GY^{12} + HY^{14} + IY^{16} + JY^{18} + KY^{20}$$

Figure 4B:
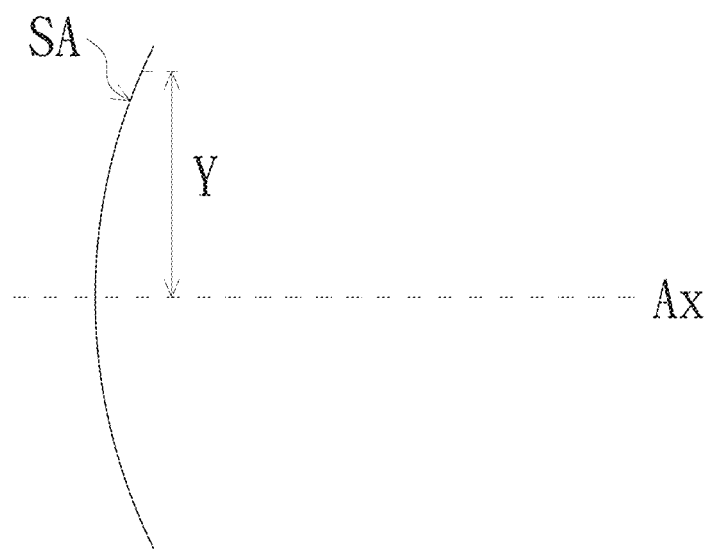
FIG. 4B is a schematic view of the radial height of an aspherical surface.

In the above equation, it can be known from the aspherical surface SA shown in FIG. 4B that Z is denoted as the coordinate value in the direction of the optical axis Ax; k is denoted as a conic constant; R is denoted as the radius of curvature; Y is denoted as the coordinate value along the direction orthogonal to the optical axis Ax, that is, the radial height of the aspherical surface SA, wherein the positive direction of Y is defined as the direction toward the top of the figure; and B, C, D, E, F, G, H and K are denoted as the aspheric coefficients. In the embodiments shown Tables 1 and 2, the aspherical coefficients B, G, H, I, J and K are omitted since they are all 0. Parameters associated with of the aspherical microlenses 231 are shown in Table 2.

TABLE 2

| Surface | k | C | D | E | F |
|---|---|---|---|---|---|
| S3 | −3.174 | −3.2E−5 | 3.151E−8 | −1.769E−9 | 1.492E−11 |
| S4 | 6.722 | −1.182E−1 | −4.78E−3 | −2.511E−1 | 3.485E−1 |
| S5 | 3.34 | 1.124E−1 | 7.596E−1 | −2.293 | 6.463 |

Figure 5A:
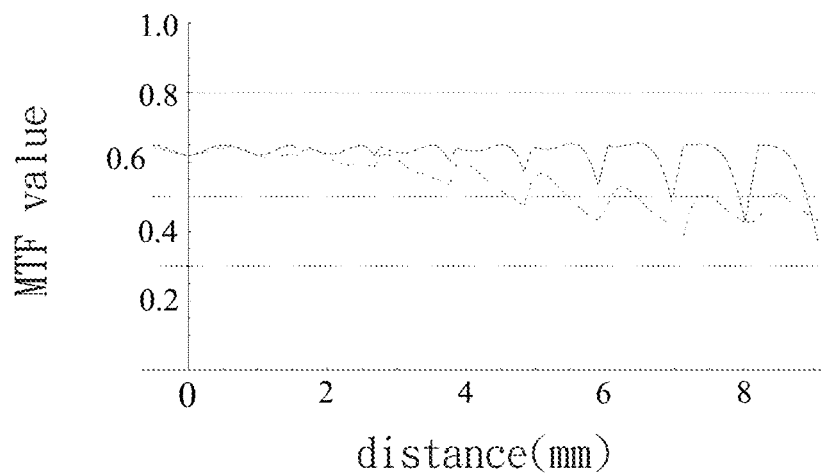
FIG. 5A shows a chart of a modulation transfer function (MTF) generated by using the near-eye light field display device of FIG. 4A, wherein each microlens of the microlens array has an identical focal length.

Referring to FIG. 5A, FIG. 5A shows a chart of a modulation transfer function (MTF) generated by using the near-eye light field display device of FIG. 4A in which each microlens of the microlens array has an identical focal length (e.g., 3.392 mm). In FIG. 5A, the horizontal axis represents the distance (unit mm) between the elemental image EI and the elemental image EI0 (i.e., the center elemental image), the vertical axis represents the MTF value, the solid-line is the MTF curve in the sagittal direction, the dashed line is the MTF curve in the tangential direction.

Figure 5B:
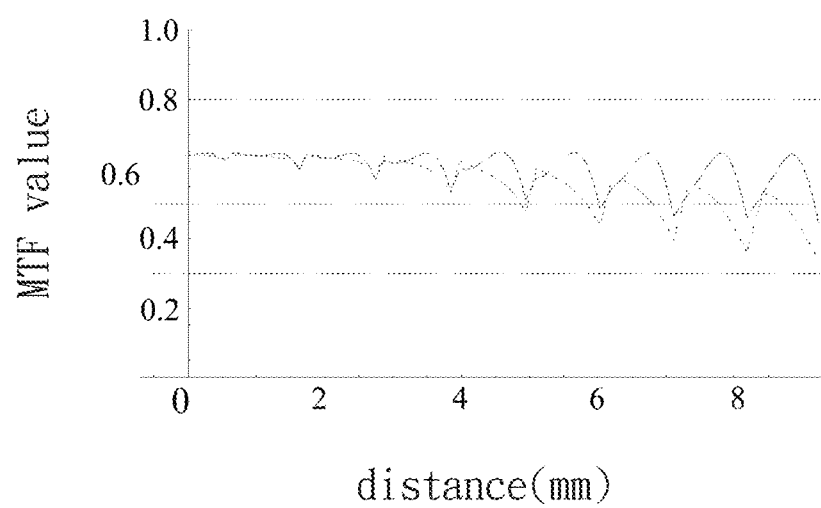
FIG. 5B shows a chart of a modulation transfer function generated by using the near-eye light field display device of FIG. 4A, wherein the microlenses of the microlens array have different focal lengths.

However, in other embodiments, the microlenses 231 of the microlens array 23 of the near-eye light field display device 20 in FIG. 4A may have different focal lengths. Please refer to the related parameters in the following Tables 3, 4 and 5 and also refer to FIG. 5B. FIG. 5B shows a chart of a modulation transfer function generated by using the near-eye light field display device of FIG. 4A in which the microlenses of the microlens array have different focal lengths (e.g., the effective focal length (EFL) in Table 5).

TABLE 3

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 14.013 | | |
| Optical element | S2 | Infinity | 1.818 | 1.533 | 55.732 |
| | S3 | −27.578 | 0.2 | | |
| Microlens array | S4 | −2.983 | 1 | 1.59 | 29.921 |
| | S5 | −1.331 | 3.5 | | |
| Display element | S6 | Infinity | | | |

TABLE 4

| Surface | k | C | D | E | F |
|---|---|---|---|---|---|
| S3 | −0.947 | −2.5E−5 | 1.977E−7 | −3.65E−9 | 2.213E−11 |
| S4 | 7.175 | −1.154E−1 | 1.977E−7 | −2.511E−1 | 3.485E−1 |
| S5 | 3.324 | 1.155E−1 | 1.977E−7 | −2.293 | 6.463 |

TABLE 5

| Distance (mm) | Radius of curvature (mm) | k | C | D | E | F | Effective focal length (mm) |
|---|---|---|---|---|---|---|---|
| 0 | −1.331 | 3.324 | 0.115 | 0.769 | −2.293 | 6.463 | 3.327 |
| 1 | −1.332 | −1.557 | −0.131 | 0.214 | −0.723 | 0.788 | 3.329 |
| 2 | −1.332 | 2.799 | 0.109 | 0.393 | −0.667 | 2.478 | 3.329 |
| 3 | −1.333 | −4.115 | −0.24 | 0.06 | 0.374 | −0.918 | 3.332 |
| 4 | −1.334 | −1.203 | −0.083 | −0.118 | 0.646 | −1.184 | 3.339 |
| 5 | −1.335 | −1.468 | −0.089 | −0.155 | 0.658 | −1.02 | 3.344 |
| 6 | −1.336 | −1.147 | −0.063 | −0.225 | 0.847 | −1.186 | 3.348 |
| 7 | −1.34 | 0.996 | 0.044 | −0.145 | 0.868 | −1.218 | 3.361 |
| 8 | −1.338 | −1.124 | −0.041 | −0.436 | 1.693 | −2.382 | 3.356 |

In the embodiments shown in Tables 3 to 5, the aspherical coefficients B, G, H, I, J and K are omitted since they are all 0. In addition, the radius of curvature of the surface S5 of the microlens array 23 in Table 3 is represented by the radius of curvature at the center of the microlens array 23. In addition, the distance in Table 5 indicates the distance between the center of the microlens 231 and the center of the microlens array 23 and corresponds to the distance between the elemental image EI and the elemental image EI0 (i.e., central elemental image) indicated by the horizontal axis in FIG. 5B, and the effective focal length in Table 5 indicates the focal length of the microlens 231.

Figure 6:
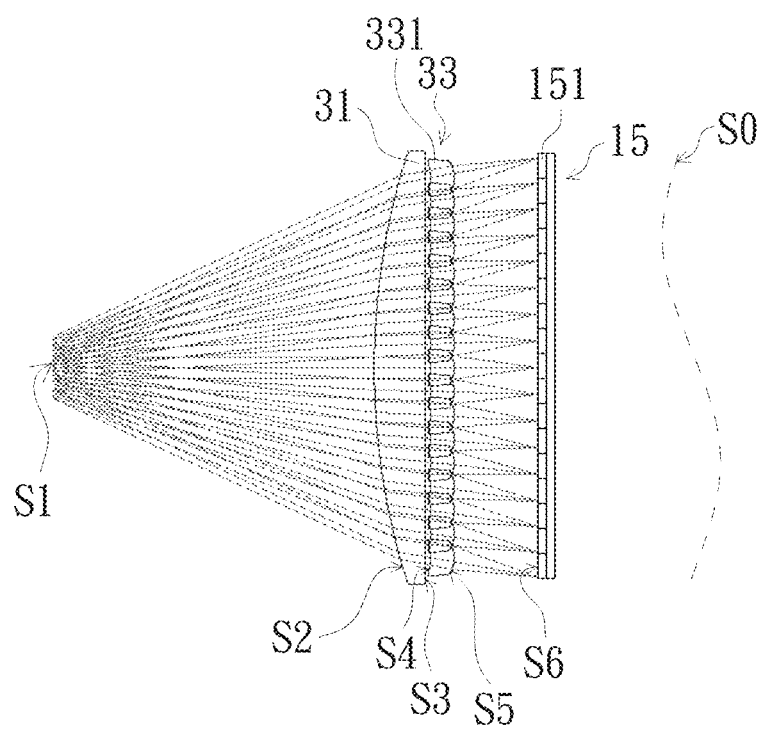
FIG. 6 is a schematic view of a near-eye light field display device in accordance with another embodiment of the invention.

FIG. 6 is a schematic view of a near-eye light field display device in accordance with another embodiment of the invention. Referring to FIG. 6, in the embodiment, the near-eye light field display device 30 includes a display element 15, a microlens array 33 and an optical element 31. The near-eye light field display device 30 of the embodiment has a similar structure and function as the near-eye light field display device 10 shown in FIG. 1. The embodiment shown in FIG. 6 is different from the embodiment shown in FIG. 1 in that the optical element 31 has a first surface S3 and a second surface S2, the first surface S3 is adjacent to the microlens array 33, the second surface S2 is away from the microlens array 33, the first surface S3 is located between the second surface S2 and the microlens array 33, the first surface S3 is a plane surface, and the second surface S2 is a convex surface. That is, the optical element 31 of the embodiment is a planoconvex lens, wherein the plane surface (first surface S3) is located between the convex surface (second surface S2) and the microlens array 33. In the embodiment, the second surface S2 may be a spherical surface or an aspherical surface, and the invention is not limited thereto. In addition, the structure of the microlens array 33 in the embodiment is similar to that in FIG. 3 and may be constituted by a plurality of microlenses 331 having identical or different focal lengths.

Taking the case where the focal lengths of each microlens 331 of the microlens array 33 are identical and the value is for example 3.304 mm as an example, other parameters are as shown in Tables 6, 7-1 and 7-2. However, it is understood that the data in Tables 6, 7-1 and 7-2 and the tables mentioned below are not intended to limit the invention. Any skilled in the art may make appropriate changes to the parameters or settings after reading the invention, but the changes in parameters or settings should still fall within the scope of the invention.

TABLE 6

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13.071 | | |
| Optical element | S2 | 22.874 | 2.432 | 1.533 | 55.732 |
| | S3 | Infinity | 0.2 | | |
| Microlens array | S4 | −2.514 | 1 | 1.59 | 29.921 |
| | S5 | −1.26 | 3.5 | | |
| Display element | S6 | Infinity | | | |

TABLE 7-1

| Surface | k | C | D | E | F |
|---|---|---|---|---|---|
| S2 | −17.913 | 1.366E−4 | −2E−6 | 1.34E−8 | −8.915E−11 |
| S4 | 4.67 | −0.122 | −1.04E−1 | 0.013 | 0 |
| S5 | 2.749 | 0.118 | 7.21E−1 | −2.119 | 5.983 |

TABLE 7-2

| Surface | G | H | I | J | K |
|---|---|---|---|---|---|
| S2 | 6.069E−13 | 2.446E−15 | −7.806E−17 | −1.358E−18 | 1.966E−20 |
| S4 | 0 | 0 | 0 | 0 | 0 |
| S5 | 0 | 0 | 0 | 0 | 0 |

Figure 7A:
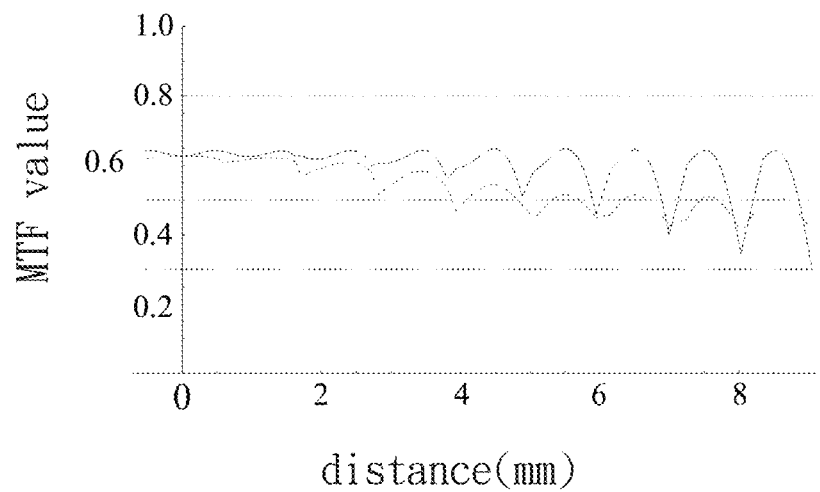
FIG. 7A shows a chart of a modulation transfer function generated by using the near-eye light field display device of FIG. 6, wherein each microlens of the microlens array has an identical focal length.
Figure 7B:
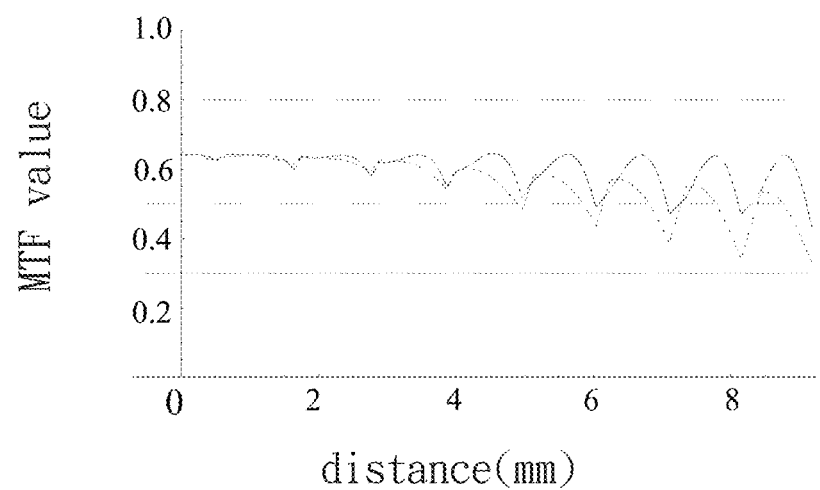
FIG. 7B shows a chart of a modulation transfer function generated by using the near-eye light field display device of FIG. 6, wherein the microlenses of the microlens array have different focal lengths.

Referring to FIG. 7A, FIG. 7A shows a chart of a modulation transfer function generated by using the near-eye light field display device of FIG. 6 in which each microlens of the microlens array has an identical focal length (e.g., 3.304 mm). However, in other embodiments, the microlenses 331 of the microlens array 33 of the near-eye light field display device 30 in FIG. 6 may have different focal lengths. Please refer to the related parameters in Tables 8, 9-1, 9-2, 10 and FIG. 7B. FIG. 7B shows a chart of a modulation transfer function generated by using the near-eye light field display device of FIG. 6 in which the microlenses of the microlens array have different focal lengths (e.g., the effective focal lengths in Table 10). In addition, the aspherical coefficient B in Table 9-1 is 0 for example. The aspherical coefficients B, G, H, I, J and K are omitted since they are all 0. In addition, the radius of curvature of the surface S5 of the microlens array 33 in Table 8 is represented by the radius of curvature at the center of the microlens array 33.

TABLE 8

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13.49 | | |

TABLE 8-continued

| Position | Surface | Radius of curvature (mm) | Spacing (mm) | Refractive index | Abbe number |
|---|---|---|---|---|---|
| Optical element | S2 | 30.735 | 2.158 | 1.533 | 55.732 |
|  | S3 | Infinity | 0.2 | | |
| Microlens array | S4 | −2.621 | 1 | 1.59 | 29.921 |
|  | S5 | −1.267 | 3.5 | | |
| Display element | S6 | | | | |

TABLE 9-1

| Surface | k | C | D | E | F |
|---|---|---|---|---|---|
| S2 | −15.582 | 9.109E−5 | −1.174E−6 | 1.531E−8 | −1.099E−10 |
| S4 | 5.664 | −0.114 | −1.16E−1 | 0.06 | 0 |
| S5 | 2.885 | 0.114 | 8.67E−1 | −2.689 | 7.113 |

TABLE 9-2

| Surface | G | H | I | J | K |
|---|---|---|---|---|---|
| S2 | 3.246E−13 | 2.246E−15 | −4.146E−17 | −9.235E−19 | 1.33E−20 |
| S4 | 0 | 0 | 0 | 0 | 0 |
| S5 | 0 | 0 | 0 | 0 | 0 |

TABLE 10

| Distance (mm) | Radius of curvature (mm) | k | C | D | E | F | Effective focal length (mm) |
|---|---|---|---|---|---|---|---|
| 0 | −1.267 | 2.885 | 0.114 | 0.867 | −2.689 | 7.113 | 3.26 |
| 1 | −1.265 | −1.212 | −0.105 | 0.109 | −0.462 | 0.599 | 3.253 |
| 2 | −1.267 | 2.553 | 0.112 | 0.548 | −1.301 | 3.837 | 3.264 |
| 3 | −1.268 | −2.156 | −0.16 | 0.089 | −0.276 | 0.314 | 3.267 |
| 4 | −1.27 | −1.309 | −0.106 | 0.028 | −0.103 | 0.072 | 3.275 |
| 5 | −1.271 | −1.237 | −0.094 | −0.059 | 0.285 | −0.529 | 3.281 |
| 6 | −1.272 | −0.956 | −0.069 | −0.136 | 0.58 | −0.936 | 3.286 |
| 7 | −1.273 | 0.367 | 0.021 | −0.195 | 0.948 | −1.385 | 3.292 |
| 8 | −1.273 | −1.161 | −0.06 | −0.322 | 1.27 | −1.845 | 3.289 |

Figure 8:
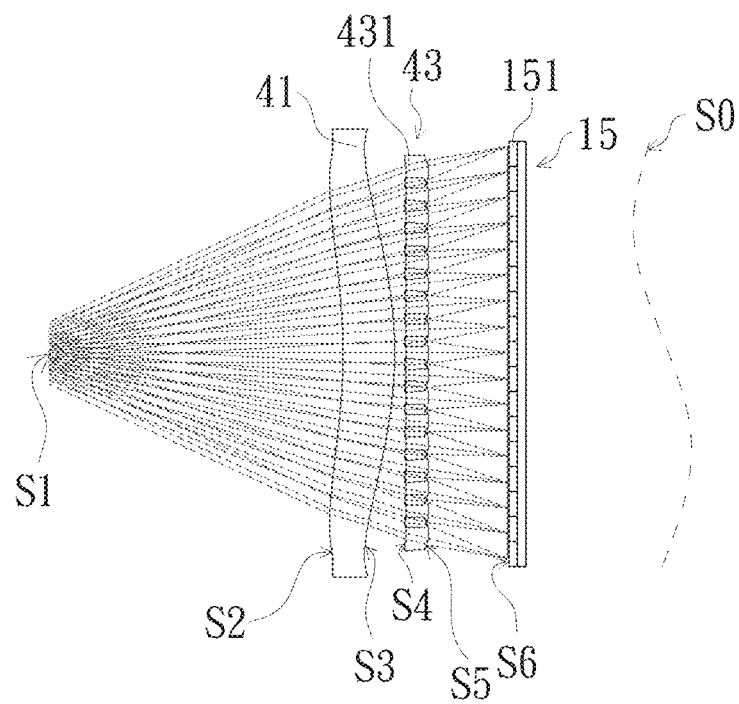
FIG. 8 is a schematic view of a near-eye light field display device in accordance with another embodiment of the invention.

FIG. 8 is a schematic view of a near-eye light field display device in accordance with another embodiment of the invention. Referring to FIG. 8, in the embodiment, the near-eye light field display device 40 includes a display element 15, a microlens array 43 and an optical element 41. The near-eye light field display device 40 of the embodiment has a similar structure and function as the near-eye light field display device 10 shown in FIG. 1. The embodiment shown in FIG. 8 is different from the embodiment shown in FIG. 1 in that the optical element 41 has a first surface S3 and a second surface S2, the first surface S3 is adjacent to the microlens array 43, the second surface S2 is away from the microlens array 43, the first surface S3 is located between the second surface S2 and the microlens array 43, the first surface S3 is a convex surface, and the second surface S2 is a concave surface. That is, the optical element 41 of the embodiment is a lens having a double-sided curvature. In the embodiment, the first surface S3 may be a spherical surface or an aspherical surface, and the second surface S2 may be a spherical surface or an aspherical surface, and the invention is not limited thereto. In addition, the structure of the microlens array 43 in the embodiment is similar to that in FIG. 3 and may be constituted by a plurality of microlenses 431 having identical or different focal lengths.

Taking the case where the focal lengths of each microlens 431 of the microlens array 43 are identical and the value is for example 3.333 mm as an example, other parameters are as shown in Tables 11 and 12. In addition, in the embodiments shown in Tables 11 and 12, the aspherical coefficients B, G, H, I, J and K are omitted since they are all 0.

TABLE 11

| Position | Surface | Radius of curvature (mm) | Spacing (mm) | Refractive index | Abbe number |
|---|---|---|---|---|---|
| Light field virtual image | S0 | 1E+18 | −1000 | | |
| Pupil | S1 | 1E+18 | 12.464 | | |
| Optical element | S2 | −24.719 | 2.632 | 1.533 | 55.732 |
| | S3 | −13.139 | 0.5 | | |
| Microlens array | S4 | −2.941 | 1 | 1.59 | 29.921 |
| | S5 | −1.327 | 3.5 | | |
| Display element | S6 | Infinity | | | |

TABLE 12

| Surface | k | C | D | E | F |
|---|---|---|---|---|---|
| S2 | 5.33 | 2.24E−4 | −2E−6 | 7.51E−9 | −2.69E−11 |
| S3 | 0.643 | 2.06E−4 | −1E−6 | 3.16E−9 | −1.54E−11 |

TABLE 12-continued

| Surface | k | C | D | E | F |
|---|---|---|---|---|---|
| S4 | 11.366 | −0.102 | 6.19E−2 | −0.46 | 0.716 |
| S5 | 3.513 | 0.118 | 9.24E−1 | −3.093 | 8.699 |

Figure 9A:
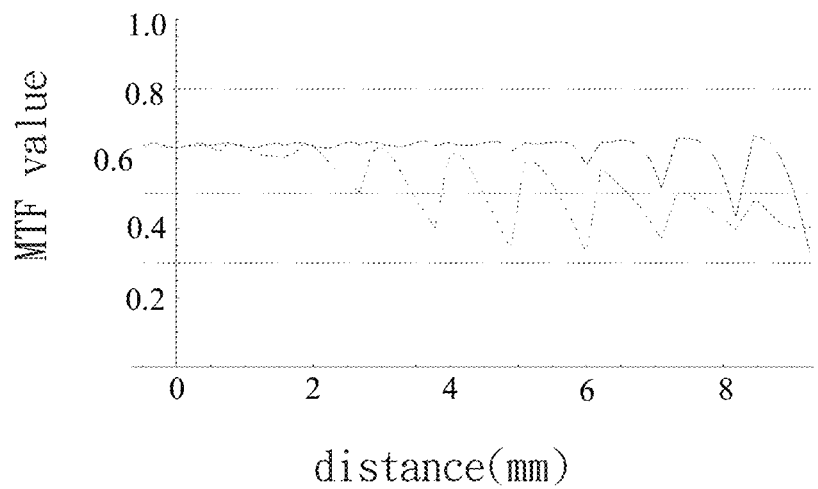
FIG. 9A shows a chart of a modulation transfer function generated by using the near-eye light field display device of FIG. 8, wherein each microlens of the microlens array has an identical focal length.
Figure 9B:
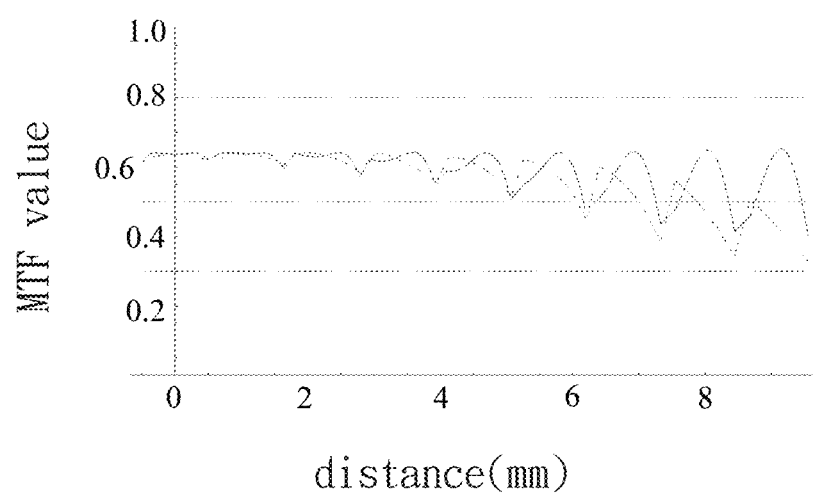
FIG. 9B shows a chart of a modulation transfer function generated by using the near-eye light field display device of FIG. 8, wherein the microlenses of the microlens array have different focal lengths.

Referring to FIG. 9A, FIG. 9A shows a chart of a modulation transfer function generated by using the near-eye light field display device of FIG. 8 in which each microlens of the microlens array has the same focal length (e.g., 3.333 mm). However, in other embodiments, the microlenses 431 of the microlens array 43 of the near-eye light field display device 40 in FIG. 8 may have different focal lengths. Please refer to the related parameters in Tables 13, 14, 15 and FIG. 9B. FIG. 9B shows a chart of a modulation transfer function generated by using the near-eye light field display device of FIG. 8 in which the microlenses of the microlens array have different focal lengths (e.g., the effective focal lengths in Table 15). In addition, in the embodiments shown in Tables 13-15, the aspherical coefficients B, G, H, I, J and K are omitted since they are all 0. In addition, the radius of curvature of the surface S5 of the microlens array 43 shown in Table 13 is represented by the radius of curvature at the center of the microlens array 43.

TABLE 13

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13 | | |
| Optical element | S2 | −23.902 | 2.283 | 1.533 | 55.732 |
| | S3 | −18 | 0.5 | | |
| Microlens array | S4 | −3.115 | 1 | 1.59 | 29.921 |
| | S5 | −1.325 | 3.5 | | |
| Display element | S6 | | | | |

TABLE 14

| Surface | k | C | D | E | F |
|---|---|---|---|---|---|
| S2 | 4.679 | 2.88E−4 | −2E−6 | 1.79E−8 | 1.29E−11 |
| S3 | 0.71 | 1.78E−4 | −1E−6 | 5.26E−9 | 3.79E−11 |
| S4 | 11.934 | −0.109 | 7.96E−2 | −0.453 | 0.351 |
| S5 | 3.441 | 0.108 | 9.93E−1 | −3.236 | 8.454 |

TABLE 15

| Distance (mm) | Radius of curvature (mm) | k | C | D | E | F | Effective focal length (mm) |
|---|---|---|---|---|---|---|---|
| 0 | −1.325 | 3.441 | 0.108 | 0.993 | −3.236 | 8.454 | 3.237 |
| 1 | −1.323 | −1.403 | −0.113 | 0.127 | −0.451 | 0.47 | 3.228 |
| 2 | −1.326 | 2.953 | 0.108 | 0.542 | −1.216 | 3.654 | 3.24 |
| 3 | −1.327 | −2.502 | −0.164 | 0.061 | −0.06 | −0.111 | 3.244 |
| 4 | −1.329 | −1.084 | −0.084 | −0.017 | 0.086 | −0.237 | 3.254 |
| 5 | −1.331 | −1.362 | −0.087 | −0.122 | 0.481 | −0.764 | 3.26 |
| 6 | −1.333 | −1.063 | −0.061 | −0.203 | 0.764 | −1.142 | 3.267 |
| 7 | −1.334 | 0.708 | 0.042 | −0.21 | 0.904 | −1.22 | 3.273 |
| 8 | −1.335 | −1.222 | −0.043 | −0.354 | 1.171 | −1.567 | 3.275 |

Figure 10:
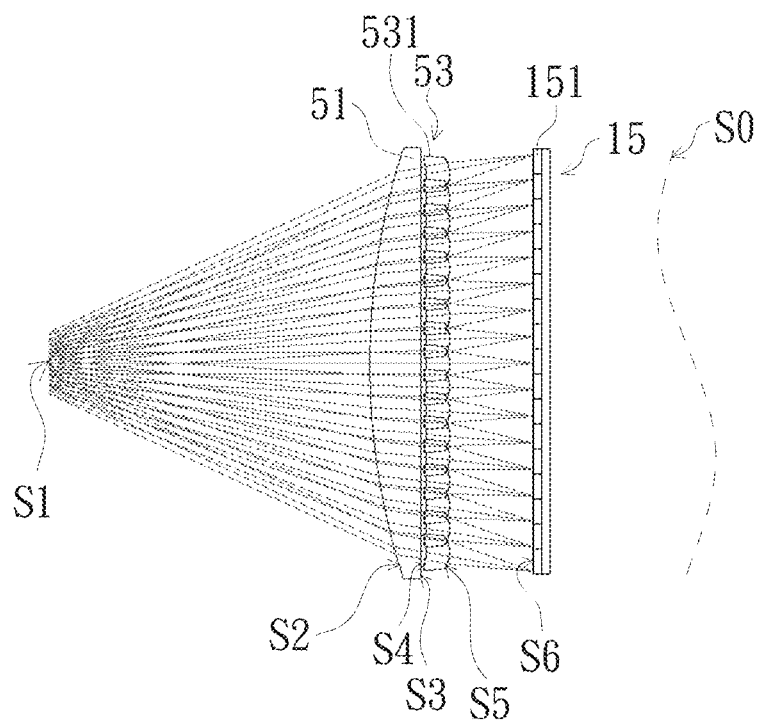
FIG. 10 is a schematic view of a near-eye light field display device in accordance with another embodiment of the invention.

FIG. 10 is a schematic view of a near-eye light field display device in accordance with another embodiment of the invention. Referring to FIG. 10, in the embodiment, the near-eye light field display device 50 includes a display element 15, a microlens array 53 and an optical element 51. The near-eye light field display device 50 of the embodiment has a similar structure and function as the near-eye light field display device 10 shown in FIG. 1. The embodiment shown in FIG. 10 is different from the embodiment shown in FIG. 1 in that the optical element 51 has a first surface S3 and a second surface S2, the first surface S3 is adjacent to the microlens array 53, the second surface S2 is away from the microlens array 53, the first surface S3 is located between the second surface S2 and the microlens array 53, the first surface S3 is a diffractive optical element (DOE) surface, and the second surface S2 is a convex surface. In the embodiment, the diffractive optical element surface (the first surface S3) can effectively reduce color difference. In the embodiment, the first surface S3 may be a spherical surface or an aspherical surface, and the invention is not limited thereto. In addition, the structure of the microlens array 53 in the embodiment is similar to that in FIG. 3 and may be constituted by a plurality of microlenses 531 having identical or different focal lengths.

Taking the case where the focal lengths of each microlens 531 of the microlens array 53 are identical and the value is for example 3.241 mm as an example, other parameters are as shown in Tables 16 to 18-2. In Table 17, the aspherical coefficients B, G, H, I, J and K are omitted since they are all 0. In addition, Tables 18-1 and 18-2 are the coefficients of the phase element (diffractive optical element surface), and its phase expansion is as follows:

$$\phi(h) = \sum_{i=2,4,6...} A_i h^i$$

where h is the radial height of the phase element (diffractive optical element surface).

TABLE 16

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13.733 | | |
| Optical element | S2 | 35.123 | 2 | 1.533 | 55.732 |
| | S3 | Infinity | 0.2 | | |
| Microlens array | S4 | −2.482 | 1 | 1.59 | 29.921 |
| | S5 | −1.242 | 3.5 | | |
| Display element | S6 | Infinity | | | |

TABLE 17

| Surface | k | C | D | E | F |
|---|---|---|---|---|---|
| S2 | −11.397 | 6.3E−5 | −1E−6 | 2.36E−8 | −1.53E−10 |
| S4 | 7.818 | −0.107 | 1.06E−1 | −1.141 | 2.411 |
| S5 | 2.725 | 0.127 | 7.68E−1 | −2.32 | 6.646 |

TABLE 18-1

| A2 | A4 | A6 | A8 | A10 |
|---|---|---|---|---|
| −1.48E−3 | 2.091E−5 | −4.4E−7 | 2.865E−9 | 1.824E−11 |

TABLE 18-2

| A12 | A14 | A16 | A18 | A20 |
|---|---|---|---|---|
| 3.389E−14 | −1.624E−15 | −1.753E−17 | −1.83E−19 | 1.434E−21 |

Figure 11A:
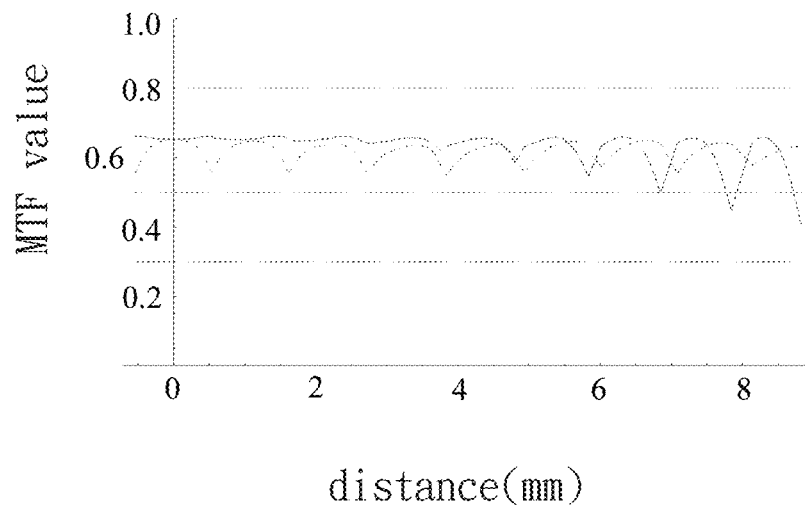
FIG. 11A shows a chart of a modulation transfer function generated by using the near-eye light field display device of FIG. 10, wherein each microlens of the microlens array has an identical focal length.
Figure 11B:
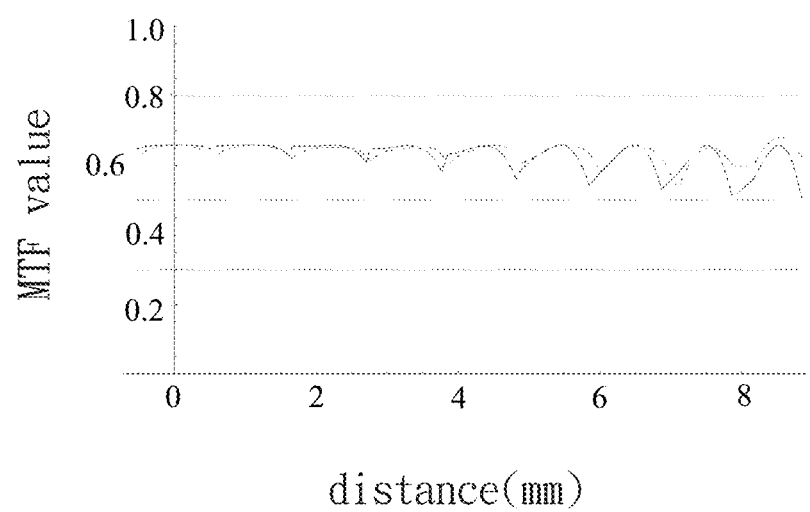
FIG. 11B shows a chart of a modulation transfer function generated by using the near-eye light field display device of FIG. 10, wherein the microlenses of the microlens array have different focal lengths.

Referring to FIG. 11A, FIG. 11A shows a chart of a modulation transfer function generated by using the near-eye light field display device of FIG. 10 in which each microlens of the microlens array has the same focal length (e.g., 3.241 mm). However, in other embodiments, the microlenses 531 of the microlens array 53 of the near-eye light field display device 50 in FIG. 10 may have different focal lengths. Please refer to the related parameters in Tables 19, 20, 21-1, 21-2, 22 and FIG. 11B. FIG. 11B shows a chart of a modulation transfer function generated by using the near-eye light field display device of FIG. 10 in which the microlenses of the microlens array have different focal lengths (e.g., the effective focal lengths in Table 22). In addition, in Tables 20 and 22, the aspherical coefficients B, G, H, I, J and K are omitted since they are all 0. In addition, the radius of curvature of the surface S5 of the microlens array 53 shown in Table 19 is represented by the radius of curvature at the center of the microlens array 53.

TABLE 19

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13.733 | | |
| Optical element | S2 | 21.024 | 2 | 1.533 | 55.732 |
| | S3 | Infinity | 0.2 | | |
| Microlens array | S4 | −2.342 | 1 | 1.59 | 29.921 |
| | S5 | −1.232 | 3.5 | | |
| Display element | S6 | Infinity | | | |

TABLE 20

| Surface | k | C | D | E | F |
|---|---|---|---|---|---|
| S2 | −3.895 | 7.60E−05 | −1E−06 | 2.19E−08 | −1.35E−10 |
| S4 | 7.756 | −0.1 | 1.05E−01 | −0.797 | 1.525 |
| S5 | 2.736 | 0.133 | 7.97E−01 | −2.38 | 7.025 |

TABLE 21-1

| A2 | A4 | A6 | A8 | A10 |
|---|---|---|---|---|
| −1.36E−03 | 1.3E−05 | −3.26E−07 | 2.41E−09 | 2.02E−11 |

TABLE 21-2

| A12 | A14 | A16 | A18 | A20 |
|---|---|---|---|---|
| 2.44E−14 | −2.08E−15 | −2.48E−17 | −2.09E−19 | 3.2E−21 |

TABLE 22

| Distance (mm) | Radius of curvature (mm) | k | C | D | E | F | Effective focal length (mm) |
|---|---|---|---|---|---|---|---|
| 0 | −1.231 | 2.736 | 0.133 | 0.797 | −2.38 | 7.025 | 3.299 |
| 1 | −1.23 | −1.58 | −0.131 | 0.112 | −0.487 | 0.65 | 3.294 |
| 2 | −1.232 | 2.358 | 0.125 | 0.5 | −1.124 | 3.671 | 3.299 |
| 3 | −1.231 | −2.003 | −0.151 | 0.048 | −0.187 | 0.228 | 3.298 |
| 4 | −1.232 | −1.377 | −0.106 | 0.008 | −0.117 | 0.161 | 3.301 |
| 5 | −1.233 | −1.359 | −0.101 | −0.034 | 0.035 | −0.035 | 3.305 |
| 6 | −1.234 | −0.952 | −0.07 | −0.067 | 0.138 | −0.162 | 3.31 |
| 7 | −1.235 | 0.591 | 0.032 | −0.015 | 0.181 | −0.128 | 3.316 |
| 8 | −1.235 | −0.831 | −0.052 | −0.153 | 0.452 | −0.578 | 3.314 |

Figure 12:
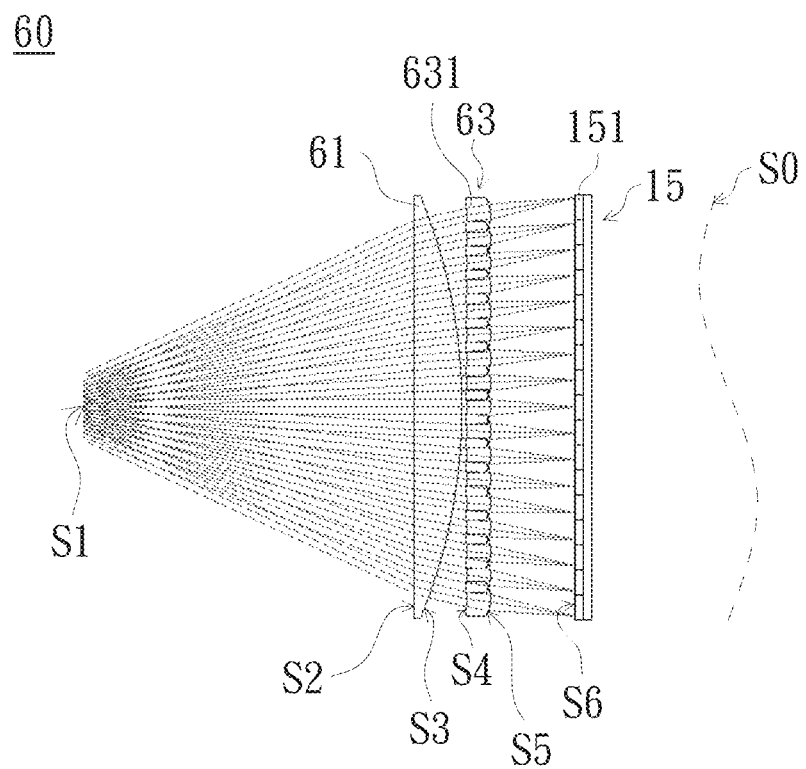
FIG. 12 is a schematic view of a near-eye light field display device in accordance with another embodiment of the invention.

FIG. 12 is a schematic view of a near-eye light field display device in accordance with another embodiment of the invention. Referring to FIG. 12, in the embodiment, the near-eye light field display device 60 includes a display element 15, a microlens array 63 and an optical element 61. The near-eye light field display device 60 of the embodiment has a similar structure and function as the near-eye light field display device 10 shown in FIG. 1. The embodiment shown in FIG. 12 is different from the embodiment shown in FIG. 1 in that the optical element 61 has a first surface S3 and a second surface S2, the first surface S3 is adjacent to the microlens array 63, the second surface S2 is away from the microlens array 63, the first surface S3 is located between the second surface S2 and the microlens array 63, the first The surface S3 is a convex surface, and the second surface S2 is a diffractive optical element surface. In the embodiment, the diffractive optical element surface (the first surface S3) can effectively reduce color difference. In the embodiment, the first surface S3 may be a spherical surface or an aspherical surface, and the invention is not limited thereto. In addition, the structure of the microlens array 63 in the embodiment is similar to that in FIG. 3 and may be constituted by a plurality of microlenses 631 having identical or different focal lengths.

Taking the case where the focal lengths of each microlens 631 of the microlens array 63 are identical and the value is for example 3.287 mm as an example, other parameters are as shown in Tables 23 to 25. In Table 24, the aspherical coefficients B, G, H, I, J and K are omitted since they are all 0.

TABLE 23

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13.733 | | |
| Optical element | S2 | Infinity | 2 | 1.533 | 55.731 |
| | S3 | −35.624 | 0.2 | | |
| Microlens array | S4 | −2.817 | 1 | 1.59 | 29.921 |
| | S5 | −1.3 | 3.5 | | |
| Display element | S6 | Infinity | | | |

TABLE 24

| Surface | k | C | D | E | F |
|---|---|---|---|---|---|
| S3 | −57.769 | −1.579E−4 | 2E−06 | −2.04E−08 | 7.96E−11 |
| S4 | 12.145 | −9.30E−02 | 0.146 | −1.036 | 2.112 |
| S5 | 2.695 | 0.118 | 0.443 | −1.016 | 3.388 |

TABLE 25

| A2 | A4 | A6 | A8 | A10 | A12 | A14 | A16 | A18 | A20 |
|---|---|---|---|---|---|---|---|---|---|
| −1.563E−03 | 3.12E−05 | −8.693E−07 | 8.96E−09 | 4.6E−11 | −8.855E−13 | −1.599E−14 | 1.774E−16 | 2.28E−18 | −2.574E−20 |

Figure 13A:
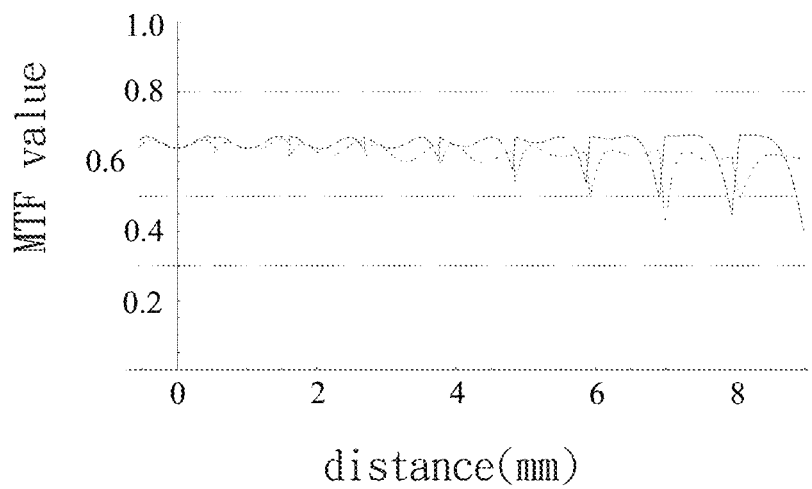
FIG. 13A shows a chart of a modulation transfer function generated by using the near-eye light field display device of FIG. 12, wherein each microlens of the microlens array has an identical focal length.
Figure 13B:
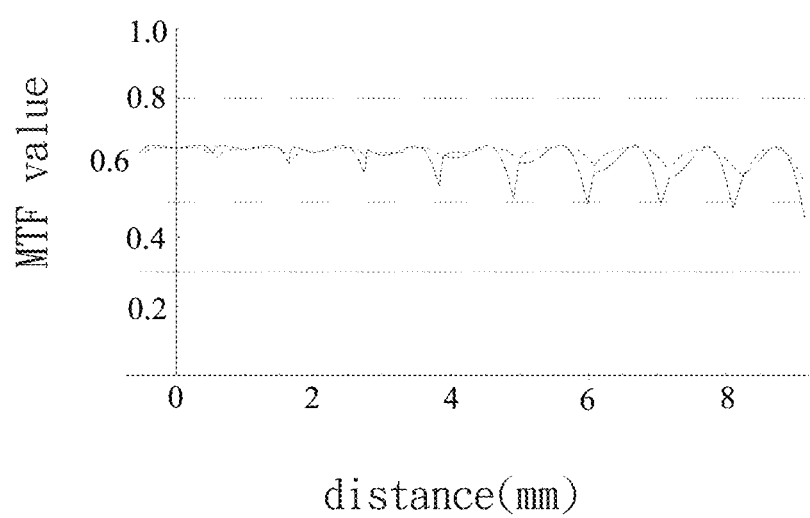
FIG. 13B shows a chart of a modulation transfer function generated by using the near-eye light field display device of FIG. 12, wherein the microlenses of the microlens array have different focal lengths.

Referring to FIG. 13A, FIG. 13A shows a chart of a modulation transfer function generated by using the near-eye light field display device of FIG. 12 in which each microlens of the microlens array has the same focal length (e.g., 3.287 mm). However, in other embodiments, the microlenses 631 of the microlens array 63 of the near-eye light field display device 60 in FIG. 12 may have different focal lengths. Please refer to the related parameters in Tables 26, 27, 28, 29 and FIG. 13B. FIG. 13B shows a chart of a modulation transfer function generated by using the near-eye light field display device of FIG. 12 in which the microlenses of the microlens array have different focal lengths (e.g., the effective focal lengths shown in Table 29). In addition, in Tables 27 and 29, the aspherical coefficients B, G, H, I, J and K are omitted since they are all 0. In addition, the radius of curvature of the surface S5 of the microlens array 63 in Table 26 is represented by the radius of curvature at the center of the microlens array 63.

Figure 14:
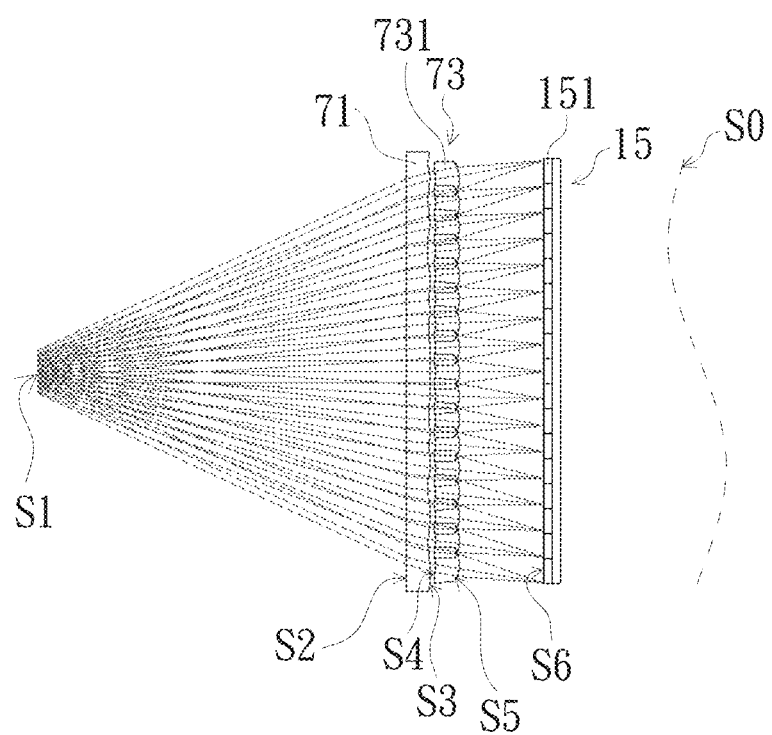
FIG. 14 is a schematic view of a near-eye light field display device in accordance with another embodiment of the invention.

FIG. 14 is a schematic view of a near-eye light field display device in accordance with another embodiment of the invention. Referring to FIG. 14, in the embodiment, the near-eye light field display device 70 includes a display element 15, a microlens array 73 and an optical element 71. The near-eye light field display device 70 of the embodiment has a similar structure and function as the near-eye light field display device 10 shown in FIG. 1. The embodiment shown in FIG. 14 is different from the embodiment shown in FIG. 1 in that the optical element 71 has a first surface S3 and a second surface S2, the first surface S3 is adjacent to the microlens array 73, the second surface S2 is away from the microlens array 73, the first surface S3 is located between the second surface S2 and the microlens array 73, the first Surface S3 is a Fresnel lens surface, and the second surface S2 is a diffractive optical element surface. In the embodiment, the Fresnel lens surface (the first surface S3) can effectively reduce the lens thickness, and the diffractive optical element surface (the second surface S2) can effectively reduce the color difference. In addition, the structure of the microlens array 73 in the embodiment is similar to that in FIG. 3 and may be constituted by a plurality of microlenses 731 having identical or different focal lengths.

Taking the case where the focal lengths of each microlens 731 of the microlens array 73 are identical and the value is for example 3.302 mm as an example, other parameters are as shown in Tables 30 to 32. In Table 31, the aspherical coefficients B, G, H, I, J and K are omitted since they are all 0.

TABLE 26

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 13.733 | | |
| Optical element | S2 | Infinity | 2 | 1.533 | 55.731 |
| | S3 | −25.011 | 0.2 | | |
| Microlens array | S4 | −3.001 | 1 | 1.59 | 29.921 |
| | S5 | −1.346 | 3.5 | | |
| Display element | S6 | Infinity | | | |

TABLE 27

| Surface | k | C | D | E | F |
|---|---|---|---|---|---|
| S3 | −6.732 | −1.339E−4 | 3E−06 | −4.24E−08 | 2.49E−10 |
| S4 | 15.576 | −7.98E−02 | 0.136 | −0.692 | 1.413 |
| S5 | 3.002 | 0.101 | 0.577 | −1.485 | 3.987 |

TABLE 28

| A2 | A4 | A6 | A8 | A10 | A12 | A14 | A16 | A18 | A20 |
|---|---|---|---|---|---|---|---|---|---|
| −1.47E−03 | 2.89E−05 | −8.85E−07 | 8E−09 | 7.68E−11 | −4.19E−13 | −1.99E−14 | 3E−17 | 2.24E−18 | −1.06E−20 |

TABLE 29

| Distance (mm) | Radius of curvature (mm) | k | C | D | E | F | Effective focal length (mm) |
|---|---|---|---|---|---|---|---|
| 0 | −1.346 | 3.001 | 0.101 | 0.577 | −1.485 | 3.987 | 3.377 |
| 1 | −1.345 | −1.531 | −0.117 | 0.155 | −0.637 | 0.854 | 3.374 |
| 2 | −1.346 | 2.479 | 0.09 | 0.319 | −0.544 | 1.68 | 3.378 |
| 3 | −1.346 | −1.967 | −0.128 | 0.043 | −0.144 | 0.14 | 3.38 |
| 4 | −1.347 | −1.81 | −0.115 | −0.014 | 0.054 | −0.123 | 3.382 |
| 5 | −1.348 | −1.661 | −0.101 | −0.068 | 0.235 | −0.353 | 3.386 |
| 6 | −1.349 | −0.672 | −0.045 | −0.115 | 0.365 | −0.495 | 3.391 |
| 7 | −1.351 | 0.764 | 0.032 | −0.103 | 0.486 | −0.586 | 3.398 |
| 8 | −1.352 | −0.955 | −0.056 | −0.137 | 0.418 | −0.543 | 3.404 |

TABLE 30

| Position | Surface | Radius of curvature (mm) | Spacing (mm) | Refractive index | Abbe number |
|---|---|---|---|---|---|
| Light field virtual image | S0 | Infinity | −1000 | | |
| Pupil | S1 | Infinity | 15.271 | | |
| Optical element | S2 | Infinity | 1 | 1.533 | 55.731 |
| | S3 | −29.562 | 0.2 | | |

TABLE 30-continued

| Position | Surface | Radius of curvature (mm) | Spacing (mm) | Refractive index | Abbe number |
|---|---|---|---|---|---|
| Microlens array | S4 | −2.655 | 1 | 1.59 | 29.921 |
|  | S5 | −1.281 | 3.5 |  |  |
| Display element | S6 | Infinity |  |  |  |

TABLE 31

| Surface | k | C | D | E | F |
|---|---|---|---|---|---|
| S3 | −3.963 | −1.887E−4 | 4E−06 | −4.553E−08 | 1.965E−10 |
| S4 | 1.6E+01 | −0.058 | 0.137 | 0 | 0 |
| S5 | 1.115 | 0.044 | 0.101 | 0 | 0 |

TABLE 32

| A2 | A4 | A6 | A8 | A10 | A12 | A14 | A16 | A18 | A20 |
|---|---|---|---|---|---|---|---|---|---|
| −2.566E−03 | 7.957E−05 | −1.605E−06 | 5.812E−09 | 2.049E−10 | −1.536E−12 | −8.962E−15 | −2.995E−16 | 8.472E−18 | −5.015E−20 |

Figure 15A:
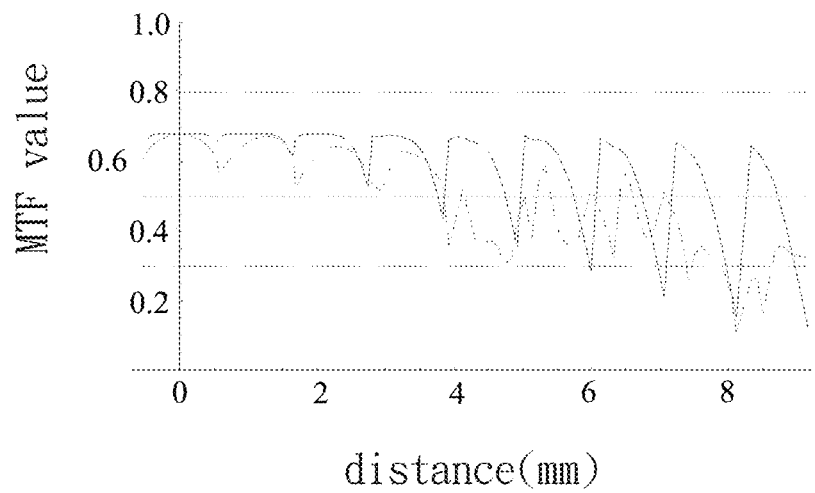
FIG. 15A shows a chart of a modulation transfer function generated by using the near-eye light field display device of FIG. 14, wherein each microlens of the microlens array has an identical focal length.
Figure 15B:
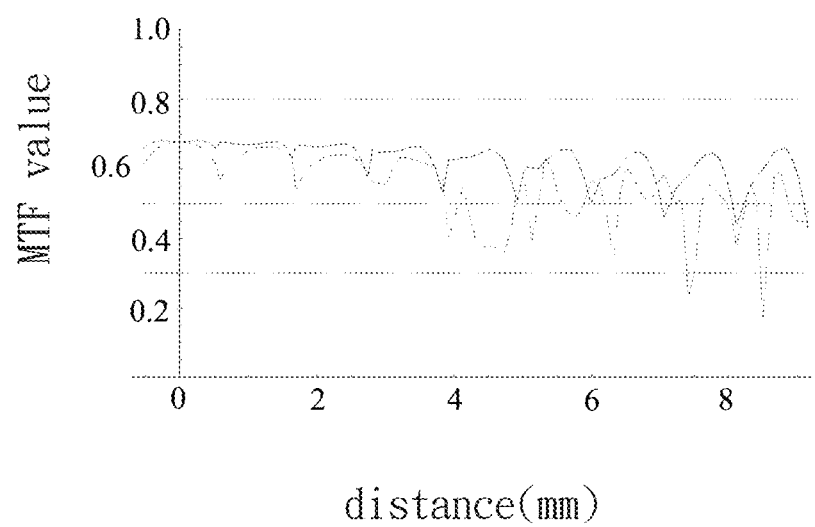
FIG. 15B shows a chart of a modulation transfer function generated by using the near-eye light field display device of FIG. 14, wherein the microlenses of the microlens array have different focal lengths.

Referring to FIG. 15A, FIG. 15A shows a chart of a modulation transfer function generated by using the near-eye light field display device of FIG. 14 in which each microlens of the microlens array has the same focal length (e.g., 3.302 mm). However, in other embodiments, the microlenses 731 of the microlens array 73 of the near-eye light field display device 70 in FIG. 14 may have different focal lengths. Please refer to the related parameters in Tables 33, 34, 35, 36 and FIG. 15B. FIG. 15B shows a chart of a modulation transfer function generated by using the near-eye light field display device of FIG. 14 in which the microlenses of the microlens array have different focal lengths (e.g., the effective focal lengths shown in Table 36). In addition, in Table 34, the aspherical coefficients B, G, H, I, J and K are omitted since they are all 0. In addition, the radius of curvature of the surface S5 of the microlens array 73 in Table 33 is represented by the radius of curvature at the center of the microlens array 73.

TABLE 33

| Position | Surface | Radius of curvature (mm) | Spacing (mm) | Refractive index | Abbe number |
|---|---|---|---|---|---|
| Light field virtual image | S0 | Infinity | −1000 |  |  |
| Pupil | S1 | Infinity | 15.271 |  |  |
| Optical element | S2 | Infinity | 1 | 1.533 | 55.732 |
|  | S3 | −30.288 | 0.2 |  |  |
| Microlens array | S4 | −3.061 | 1 | 1.59 | 29.921 |
|  | S5 | −1.35 | 3.5 |  |  |
| Display element | S6 | Infinity |  |  |  |

TABLE 34

| Surface | k | C | D | E | F |
|---|---|---|---|---|---|
| S3 | −6.43 | −1.915E−4 | 4E−06 | −4.578E−08 | 2.11E−10 |
| S4 | 20.4 | −0.053 | 1.043E−01 | 0 | 0 |
| S5 | 1.681 | 0.056 | 1.514E−01 | 0 | 0 |

TABLE 35

| A2 | A4 | A6 | A8 | A10 | A12 | A14 | A16 | A18 | A20 |
|---|---|---|---|---|---|---|---|---|---|
| −2.41E−03 | 6.95E−05 | −1.46E−06 | 5.96E−09 | 1.93E−10 | −1.6E−12 | −7.48E−15 | −2.75E−16 | 8.59E−18 | −5.68E−20 |

TABLE 36

| Distance (mm) | Radius of curvature (mm) | k | C | D | E |
|---|---|---|---|---|---|
| 0 | −1.35 | 1.681 | 0.056 | 0.151 | 3.362 |
| 1 | −1.348 | −1.165 | −0.078 | −0.006 | 3.354 |
| 2 | −1.349 | 0.992 | 0.029 | 0.072 | 3.358 |
| 3 | −1.348 | −1.479 | −0.09 | −0.011 | 3.355 |
| 4 | −1.352 | −1.284 | −0.084 | −0.007 | 3.371 |
| 5 | −1.355 | −1.135 | −0.079 | −0.004 | 3.384 |
| 6 | −1.349 | −0.698 | −0.042 | −0.032 | 3.361 |
| 7 | −1.35 | −0.854 | −0.049 | −0.037 | 3.364 |
| 8 | −1.354 | −1.666 | −0.095 | −0.027 | 3.382 |

Figure 16:
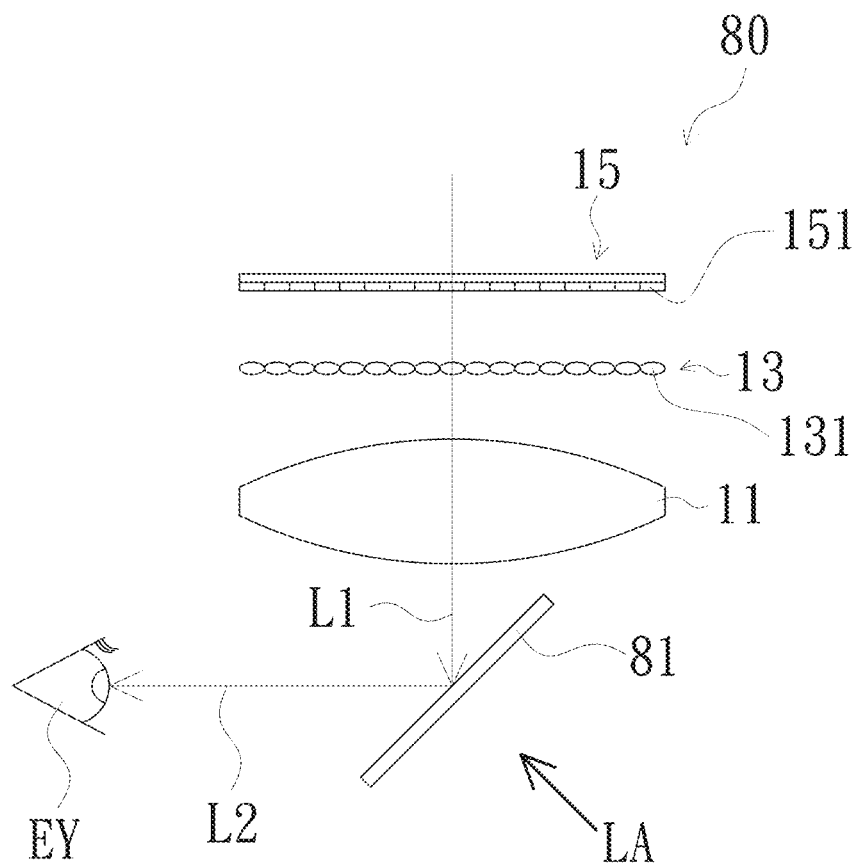
FIG. 16 is a schematic view of a near-eye light field display device in accordance with another embodiment of the invention.

FIG. 16 is a schematic view of a near-eye light field display device in accordance with another embodiment of the invention. Referring to FIG. 16, in the embodiment, the near-eye light field display device 80 includes a display element 15, a microlens array 13, an optical element 11 and a light redirecting element 81. The near-eye light field display device 80 of the embodiment has a similar structure and function as the near-eye light field display device 10 shown in FIG. 1. The embodiment shown in FIG. 16 is different from the embodiment shown in FIG. 1 in that the near-eye light field display device 80 further includes a light redirecting element 81. The elemental image beam (not shown) becomes the image beam L1 after passing through the optical element 11. The light redirecting element 81 is located on the transmission path of the image beam L1 from the optical element 11 and is disposed on a side of the optical element 11 away from the microlens array 13. In the embodiment, the optical element 11 is located between the light redirecting element 81 and the microlens array 13. In the embodiment, the image beam L1 is reflected by the light redirecting element 81 and then directed toward the user's eyes EY (the image beam L2).

In the embodiment, the light redirecting element 81 may be a partially-penetrating-and-partially-reflecting element for example. Therefore, light beam LA from the external ambient light source can penetrate the light redirecting element 81 to the user's eyes EY, so that the near-field light field display device 80 of the embodiment can be applied to a virtual reality application or the like, for example.

Figure 17A:
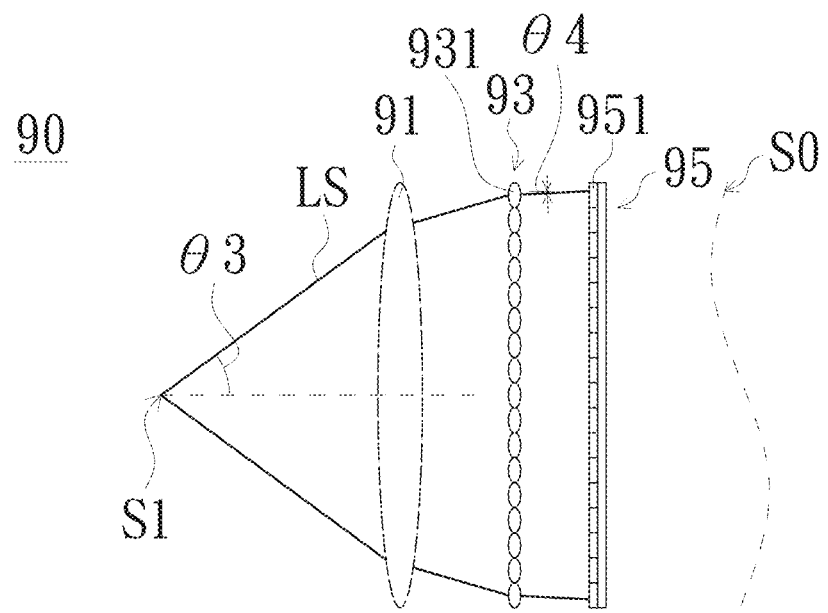
FIGS. 17A and 17B are schematic views of a near-eye display device in different zooming states in accordance with an embodiment of the invention.
Figure 17B:
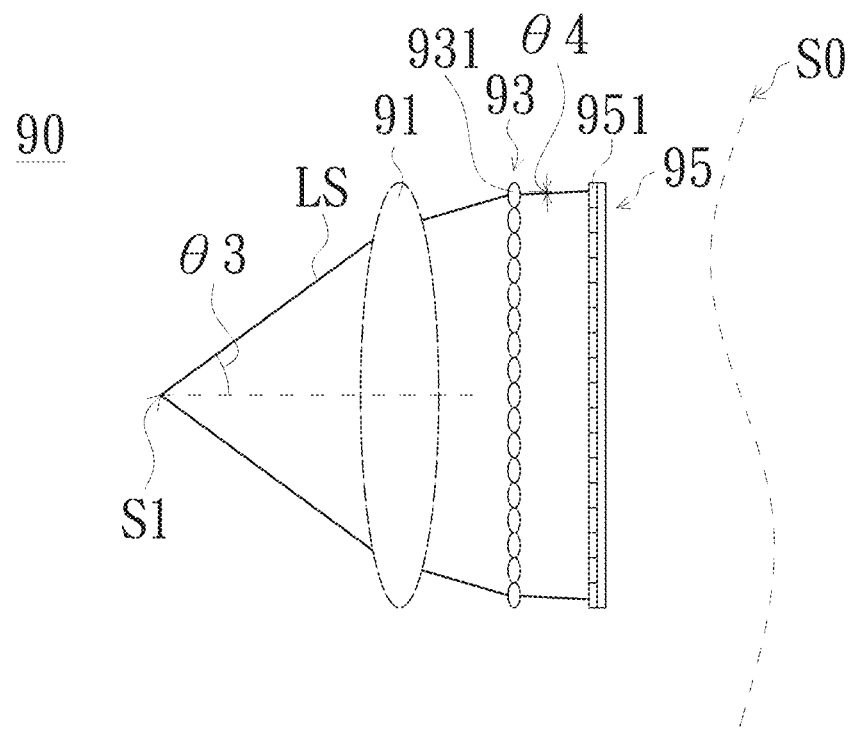

However, at least one of the microlens array and the optical element in the above embodiments may have an adjustable focal length, as illustrated below. FIGS. 17A and 17B are schematic views of a near-eye display device in different zooming states in accordance with an embodiment of the invention. Referring to FIGS. 17A and 17B, the near-eye display device 90 of the embodiment includes a display element 95, a microlens array 93 and an optical element 91. The near-eye display device 90 is, for example, a near-eye light field display device. The display device 95 has a plurality of micro-image units 951. Each of the micro-image units 951 is used for providing an elemental image beam LS (FIGS. 17A and 17B are schematically illustrated with the upper boundary of the elemental image beam LS emitted from the micro-image unit 951 located on the upper edge and the lower boundary of the elemental image beam LS emitted from the micro-image unit 951 located on the lower edge as examples). The microlens array 93 is disposed in front of the display element 95 and has a plurality of microlenses 931. The microlenses 931 correspond to the micro-image units 951, respectively. The optical element 91 is disposed in front of the microlens array 3 and is located on the transmission path of the elemental image beams LS from the microlenses 931. The microlens array 93 is located between the optical element 91 and the display element 95, and each of the elemental image beams LS is projected toward the optical element 91 through the corresponding microlens 931. In addition, in the embodiment, the optical element 91 has an adjustable focal length.

The display element 95 and the microlens array 93 are similar to the display element 15 and the microlens array 13 shown in FIG. 1 respectively, and not described in detail. The optical element 91 of the embodiment is, for example, a liquid lens, a liquid crystal lens or other optical elements with an adjustable focal length.

Similar to the embodiment of FIG. 1, in the embodiments of FIGS. 17A and 17B, the elemental image beam LS can be turned by a large angle due to the use of the optical element 91, the incident angle θ3 of the elemental image beam LS entering the user's eyes EY (i.e., the surface S1 in FIGS. 17A and 17B) may be much greater than the exit angle θ4 of the elemental image beam LS emitted from the micro-image unit 951. Therefore, the near-eye display device 90 can achieve a large field of view without a great overall thickness.

In the embodiment, since the optical element 91 has an adjustable focal length, the near-eye display device 90 has the focus accommodation function, such that the field of view and angular resolution can be changed by adjusting the focal length of the optical element 91. For example, since the focal length of the optical element 91 in FIG. 17A is longer than that of the optical element 91 in FIG. 17B, the field of view of the light field virtual image S0 in FIG. 17A is narrower than that of the light field virtual image S0 in FIG. 17B, and the exit angle θ4 shown in FIG. 17A is larger than that shown in FIG. 17B. In the embodiments of FIGS. 17A and 17B, it is to be noted that the difference in the shapes of the optical elements 91 is schematically shown to illustrate the difference in focal lengths for the benefit of clarity, rather than to specifically limit the shape of the optical element 91.

Figure 18A:
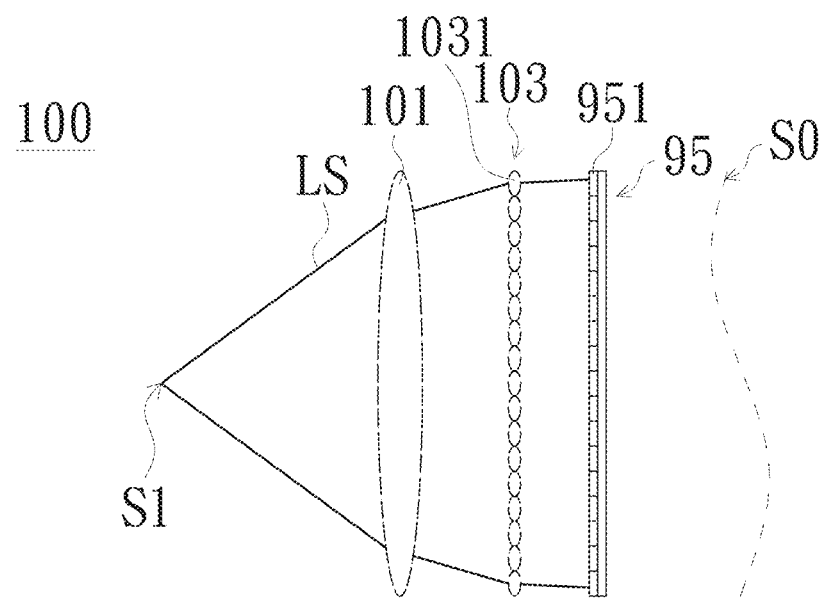
FIGS. 18A and 18B are schematic views of a near-eye display device in different zooming states in accordance with another embodiment of the invention.
Figure 18B:
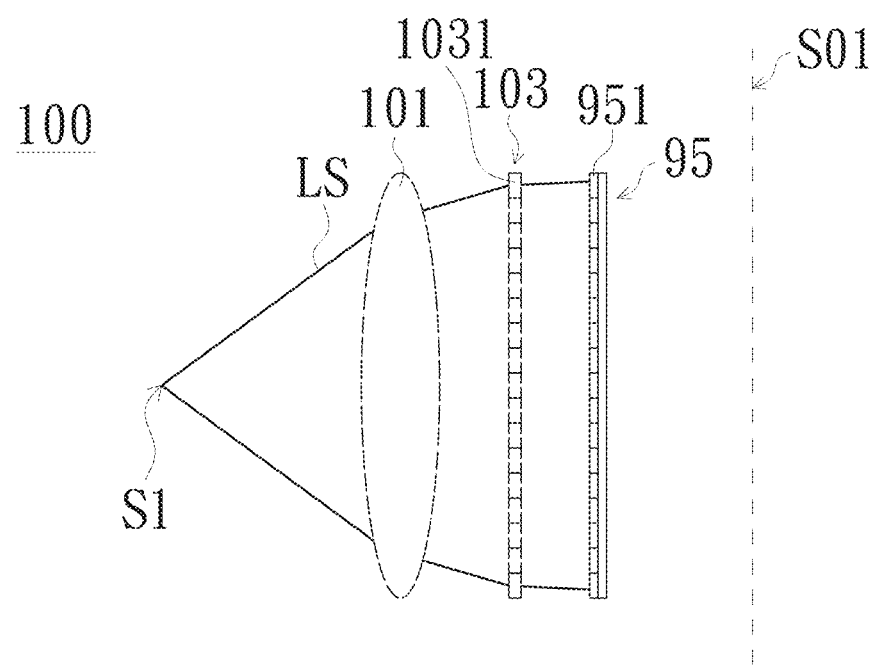

FIGS. 18A and 18B are schematic views of a near-eye display device in different zooming states in accordance with another embodiment of the invention. Referring to FIGS. 18A and 18B, the near-eye display device 100 of the embodiment includes a display element 95, a microlens array 103 and an optical element 101. The near-eye display device 100 in the embodiment has a similar structure and function to the near-eye display device 90 and the difference is that the microlens array 103 in the embodiment has an adjustable focal length, that is, each microlens 1031 of the microlens array 103 in the embodiment has an adjustable focal length. Adjusting the focal length of the microlens array 103 means adjusting the focal lengths of the microlenses 1031. In the embodiment, each microlens 1031 is, for example, a liquid lens, a liquid crystal lens or other optical elements with an adjustable focal length.

In the embodiments of FIGS. 18A and 18B, since the microlens array 103 and the optical element 101 both have an adjustable focal length, the field of view and angular resolution can be changed by selectively adjusting the focal length of the microlens array 103 and/or the focal length of the optical element 91, so that the near-eye display device 100 can have a wider adjustment range. Specifically, in the embodiment, the near-eye display device 100 may include a near-eye light field display device and may also include a near-eye display device without the function of light-field display. For example, in the embodiment of FIG. 18A, the microlens array 103 has a certain refractive power such that the near-eye display device 100 may form a light field virtual image S0 having a depth of field. In the embodiment of FIG. 18B, the focal length of the microlens array 103 is adjusted to infinity (i.e., zero refractive power) for example, so that the virtual image S01 formed by the near-eye display device 100 may have no depth of field. As a result, through the adjustment of the focal length, the near-eye display device 100 can be switched to a near-eye light field display device or a near-eye display device without the function of light field display so as to improve the versatility and convenience during use.

Figure 19A:
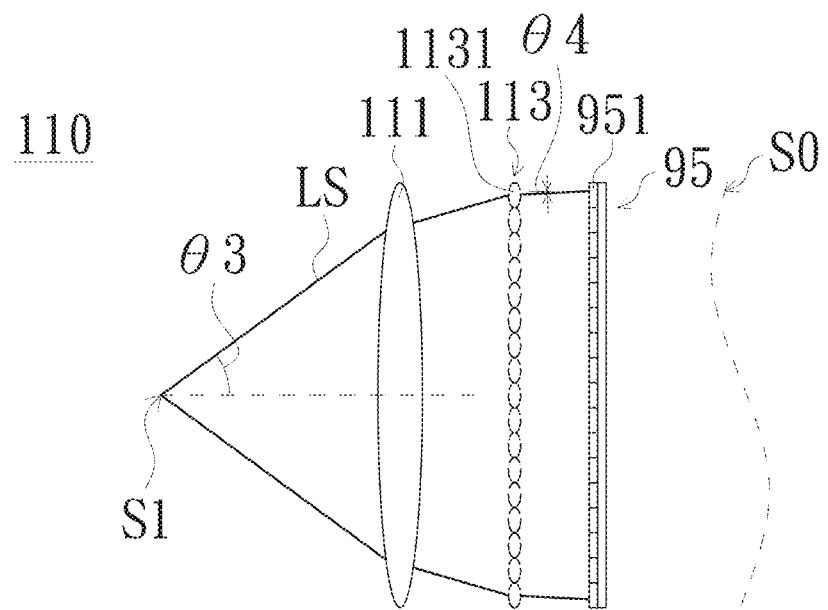
FIGS. 19A and 19B are schematic views of a near-eye display device in different zooming states in accordance with another embodiment of the invention.
Figure 19B:
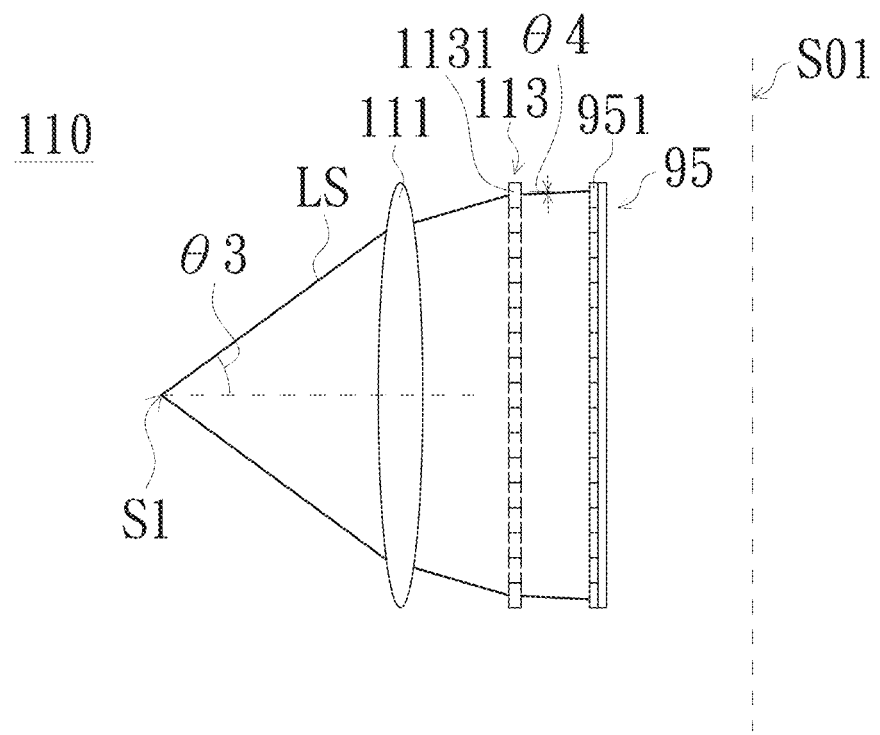

FIGS. 19A and 19B are schematic views of a near-eye display device in different zooming states in accordance with another embodiment of the invention. Referring to FIGS. 19A and 19B, the near-eye display device 110 of the embodiment includes a display element 95, a microlens array 113 and an optical element 111. The near-eye display device 110 in the embodiment has a similar structure and function to the near-eye display device 100 and the difference is that the optical element 111 of the embodiment does not have an adjustable focal length. In the embodiment, the microlens array 113 has an adjustable focal length, that is, each microlens 1131 of the microlens array 113 has an adjustable focal length. Each microlens 1131 may be a liquid lens, a liquid crystal lens or other optical elements with an adjustable focal length.

In the embodiments of FIGS. 19A and 19B, the field of view and the angular resolution may be changed by adjusting the focal length of the microlens array 113. In the embodiment of FIG. 19A, the microlens array 113 has a certain refractive power, such that the near-eye display device 110 may form a light field virtual image S0 having a depth of field. In the embodiment of FIG. 19B, the focal length of the microlens array 113 is adjusted to infinity (i.e., zero refractive power) for example, so that the virtual image S01 formed by the near-eye display device 110 may have no depth of field. As a result, through the adjustment of the focal length, the near-eye display device 110 can be switched to a near-eye light field display device or a near-eye display device without the function of light field display, so as to improve the versatility and convenience during use. Similarly, in the embodiment, since the microlens array 113 has an adjustable focal length and the focal length of the microlens array 113 in FIG. 19A is shorter than that in FIG. 19B, the exit angle θ4 in FIG. 19A is smaller than that in FIG. 19B. In the embodiments of FIGS. 19A and 19B, it is to be noted that the difference in the shapes of the microlens arrays 113 is schematically shown to illustrate the difference in focal lengths for the benefit of clarity, rather than to specifically limit the shape of the microlens array 113.

In addition, the Abbe number of the microlens arrays 93, 103, 113 is denoted by $Vd_{MLA}$, the refractive index of the microlens arrays 93, 103, 113 is denoted by $nd_{MLA}$, the Abbe number of the optical elements 91, 101, 111 is denoted by $Vd_{OE}$, and the refractive index of the optical elements 91, 101, 111 is denoted by $nd_{OE}$. The relationship between the values of $Vd_{MLA}$ and $Vd_{OE}$, and the relationship between the values of $nd_{MLA}$ and $nd_{OE}$ may be set as required by different designs. In one embodiment, the microlens arrays 93, 103, 113 and the respective optical elements 91, 101, 111 meet at least one of the conditions: $Vd_{OE}>Vd_{MLA}$ and $nd_{OE}<nd_{MLA}$. In another embodiment, the microlens arrays 93, 103, 113 and the respective optical elements 91, 101, 111 meet at least one of the conditions: $Vd_{OE}<Vd_{MLA}$ and $nd_{OE}>nd_{MLA}$. In yet another embodiment, the microlens arrays 93, 103, 113 and the respective optical elements 91, 101, 111 meet at least one of the conditions: $Vd_{OE}=Vd_{MLA}$ and $nd_{OE}=nd_{MLA}$.

In summary, with the configuration in which an optical element is disposed in front of the microlens array and the optical element and the microlens array meet at least one of the following conditions: $Vd_{OE}>Vd_{MLA}$ and $nd_{OE}<nd_{MLA}$, the near-eye light field display device of the embodiment of the invention can achieve a reduced thickness and weight of the near-eye light field display device and an improved field of view. In addition, since at least one of the microlens array and the optical element has an adjustable focal length, the near-eye display device in the embodiment of the invention has a function of focus accommodation and can change the field of view and the angular resolution.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A near-eye light field display device, comprising:
    a display element, comprising a plurality of micro-image units, wherein each of the plurality of micro-image units is configured to provide an elemental image beam;
    a microlens array, disposed in front of the display element and comprising a plurality of microlenses, wherein the plurality of microlenses corresponds to the plurality of micro-image units respectively; and
    an optical element, disposed in front of the microlens array and located on a transmission path of the elemental image beams after passing through the plurality of microlenses, wherein the microlens array is located between the optical element and the display element, and each of the elemental image beams is projected toward the optical element after passing through a corresponding one of the plurality of microlens, wherein an Abbe number of the microlens array is $Vd_{MLA}$, a refractive index of the microlens array is $nd_{MLA}$, an Abbe number of the optical element is $Vd_{OE}$, a refractive index of the optical element is $nd_{OE}$, and the microlens array and the optical element meet at least one of conditions: $Vd_{OE} > Vd_{MLA}$, and $nd_{OE} < nd_{MLA}$.

2. The near-eye light field display device according to claim 1, wherein the optical element has a first surface and a second surface, the first surface is adjacent to the microlens array, and the second surface is away from the microlens array, wherein the first surface is a convex surface, and the second surface is a plane surface, and wherein the first surface is a spherical surface or an aspherical surface.

3. The near-eye light field display device according to claim 1, wherein the optical element has a first surface and a second surface, the first surface is adjacent to the microlens array, and the second surface is away from the microlens array, wherein the first surface is a plane surface, and the second surface is a convex surface, and wherein the second surface is a spherical surface or an aspherical surface.

4. The near-eye light field display device according to claim 1, wherein the optical element has a first surface and a second surface, the first surface is adjacent to the microlens array, and the second surface is away from the microlens array, wherein the first surface has a convex surface, and the second surface has a concave surface, and wherein the first surface is a spherical surface or an aspherical surface, and the second surface is a spherical surface or an aspherical surface.

5. The near-eye light field display device according to claim 1, wherein the optical element has a first surface and a second surface, the first surface is adjacent to the microlens array, and the second surface is away far from the microlens array, wherein the first surface is a diffractive optical element surface, and the second surface is a convex surface, and wherein the second surface is a spherical surface or an aspherical surface.

6. The near-eye light field display device according to claim 1, wherein the optical element has a first surface and a second surface, the first surface is adjacent to the microlens array, and the second surface is away from the microlens array, wherein the first surface is a convex surface, and the second surface is a diffractive optical element surface, and wherein the first surface is a spherical surface or an aspherical surface.

7. The near-eye light field display device according to claim 1, wherein the optical element has a first surface and a second surface, the first surface is adjacent to the microlens array, and the second surface is away from the microlens array, and wherein the first surface is a Fresnel lens surface, and the second surface is a diffractive optical element surface.

8. The near-eye light field display device according to claim 1, further comprising a light redirecting element, wherein the elemental image beams are converted into image beams after passing through the optical element, and the light redirecting element is located on a transmission path of the image beams from the optical element.

9. The near-eye light field display device according to claim 8, wherein the light redirecting element is a partially-penetrating-and-partially-reflecting element.

10. The near-eye light field display device according to claim 1, wherein focal lengths of the plurality of microlenses are identical.

11. The near-eye light field display device according to claim 1, wherein focal lengths of the plurality of microlenses are different.

12. The near-eye light field display device according to claim 1, wherein the microlens array has an adjustable focal length.

13. The near-eye light field display device according to claim 1, wherein the optical element has an adjustable focal length.

14. A near-eye display device, comprising:
a display element, comprising a plurality of micro-image units, wherein each of the plurality of micro-image units is configured to provide an elemental image beam;
a microlens array, disposed in front of the display element and comprising a plurality of microlenses, wherein the plurality of microlenses corresponds to the plurality of micro-image units respectively; and
an optical element, disposed in front of the microlens array and located on a transmission path of the elemental image beams after passing through the plurality of microlenses, wherein the microlens array is located between the optical element and the display element, and each of the elemental image beams is projected toward the optical element after passing through a corresponding one of the plurality of microlens,
wherein at least one of the microlens array and the optical element has an adjustable focal length,
wherein an Abbe number of the microlens array is $Vd_{MLA}$, a refractive index of the microlens array is $nd_{MLA}$, an Abbe number of the optical element is $Vd_{OE}$, a refractive index of the optical element is $nd_{OE}$, and the microlens array and the optical element meet at least one of conditions: $Vd_{OE} > Vd_{MLA}$ and $nd_{OE} < nd_{MLA}$.

15. A near-eye display device, comprising:
a display element, comprising a plurality of micro-image units, wherein each of the plurality of micro-image units is configured to provide an elemental image beam;
a microlens array, disposed in front of the display element and comprising a plurality of microlenses, wherein the plurality of microlenses corresponds to the plurality of micro-image units respectively; and
an optical element, disposed in front of the microlens array and located on a transmission path of the elemental image beams after passing through the plurality of microlenses, wherein the microlens array is located between the optical element and the display element, and each of the elemental image beams is projected toward the optical element after passing through a corresponding one of the plurality of microlens,
wherein at least one of the microlens array and the optical element has an adjustable focal length,
wherein an Abbe number of the microlens array is $Vd_{MLA}$, a refractive index of the microlens array is $nd_{MLA}$, an Abbe number of the optical element is $Vd_{OE}$, a refractive index of the optical element is $nd_{OE}$, and the microlens array and the optical element meet y at least one of conditions: $Vd_{OE} < Vd_{MLA}$ and $nd_{OE} > nd_{MLA}$.

16. A near-eye display device, comprising:
a display element, comprising a plurality of micro-image units, wherein each of the plurality of micro-image units is configured to provide an elemental image beam;

a microlens array, disposed in front of the display element and comprising a plurality of microlenses, wherein the plurality of microlenses corresponds to the plurality of micro-image units respectively; and an optical element, disposed in front of the microlens array and located on a transmission path of the elemental image beams after passing through the plurality of microlenses, wherein the microlens array is located between the optical element and the display element, and each of the elemental image beams is projected toward the optical element after passing through a corresponding one of the plurality of microlens, wherein at least one of the microlens array and the optical element has an adjustable focal length, wherein an Abbe number of the microlens array is $Vd_{MLA}$, a refractive index of the microlens array is $nd_{MLA}$, an Abbe number of the optical element is $Vd_{OE}$, a refractive index of the optical element is $nd_{OE}$, and the microlens array and the optical element meet at least one of conditions: $Vd_{OE}=Vd_{MLA}$ and $nd_{OE}=nd_{MLA}$.

* * * * *